United States Patent
Khosla et al.

(10) Patent No.: US 12,472,067 B2
(45) Date of Patent: Nov. 18, 2025

(54) ORTHOPAEDIC IMPLANT SYSTEMS INCLUDING FIXATION FEATURES AND METHODS OF REPAIR

(71) Applicant: ARTHREX, INC., Naples, FL (US)

(72) Inventors: Rudraksh Khosla, Naples, FL (US); Mark Wise, Naples, FL (US); John David Paterson, Naples, FL (US); Gregory Guederian, Naples, FL (US)

(73) Assignee: ARTHREX, INC., Naples, FL (US)

( * ) Notice: Subject to any disclaimer, the term of this patent is extended or adjusted under 35 U.S.C. 154(b) by 645 days.

(21) Appl. No.: 17/942,046

(22) Filed: Sep. 9, 2022

(65) Prior Publication Data

US 2024/0082005 A1 Mar. 14, 2024

(51) Int. Cl.
*A61F 2/30* (2006.01)
*A61B 17/72* (2006.01)

(52) U.S. Cl.
CPC .......... *A61F 2/30749* (2013.01); *A61B 17/72* (2013.01); *A61F 2002/30331* (2013.01); *A61F 2002/30383* (2013.01); *A61F 2002/30433* (2013.01); *A61F 2002/30604* (2013.01)

(58) Field of Classification Search
CPC ........ A61F 2/30749; A61F 2002/30331; A61F 2002/30383; A61F 2002/30433; A61F 2002/30604; A61F 2/4059; A61F 2002/30332; A61F 2002/30616; A61F 2002/4029; A61F 2002/4037; A61F 2002/4044; A61F 2/4014; A61F 2/30734; A61F 2/30; A61B 17/72
See application file for complete search history.

(56) References Cited

U.S. PATENT DOCUMENTS

| | | | |
|---|---|---|---|
| 4,012,796 A | 3/1977 | Weisman et al. | |
| 5,358,526 A | 10/1994 | Tornier | |
| 5,507,817 A | 4/1996 | Craig et al. | |
| 5,507,830 A | 4/1996 | DeMane et al. | |
| 5,746,771 A | 5/1998 | Clement, Jr. et al. | |
| 5,961,555 A * | 10/1999 | Huebner | A61F 2/4657 623/19.11 |
| 6,228,120 B1 | 5/2001 | Leonard et al. | |
| 6,436,145 B1 | 8/2002 | Miller | |

(Continued)

FOREIGN PATENT DOCUMENTS

DE 29918589 1/2000
EP 0679375 11/1995

(Continued)

OTHER PUBLICATIONS

International Search Report for International Application No. PCT/US2023/029605 mailed Jan. 30, 2024.

(Continued)

*Primary Examiner* — Yashita Sharma
(74) *Attorney, Agent, or Firm* — Carlson, Gaskey & Olds, P.C.

(57) ABSTRACT

This disclosure relates to orthopaedic implant systems and methods for restoring functionality to a bone and/or joint. The implant systems disclosed herein may include a taper locking mechanism to limit or otherwise oppose separation between components and may include one or more flanges adapted to abut an exterior of the bone.

25 Claims, 19 Drawing Sheets

(56) References Cited

U.S. PATENT DOCUMENTS

| | | |
|---|---|---|
| 6,447,549 B1 | 9/2002 | Taft |
| 6,866,683 B2 | 3/2005 | Gerbec et al. |
| 7,175,664 B1 | 2/2007 | Lakin |
| 7,621,961 B2 | 11/2009 | Stone |
| 7,867,282 B2 | 1/2011 | Heck et al. |
| 8,118,875 B2 | 2/2012 | Rollet |
| 8,454,706 B2 | 6/2013 | de Beaubien |
| 8,500,815 B2 | 8/2013 | Fockens |
| 8,500,819 B2 | 8/2013 | Meridew et al. |
| 9,039,778 B2 | 5/2015 | Burnikel |
| 9,308,005 B2 | 4/2016 | Fitz et al. |
| 9,622,869 B2 * | 4/2017 | Nerot .................. A61F 2/30767 |
| 9,775,714 B2 | 10/2017 | Kurtz |
| 9,814,583 B2 | 11/2017 | Aquilo et al. |
| 10,251,752 B2 | 4/2019 | Satterthwaite et al. |
| 10,390,972 B2 | 8/2019 | Rao |
| 10,736,747 B2 | 8/2020 | May et al. |
| 10,765,524 B2 | 9/2020 | Boileau et al. |
| 10,799,335 B2 | 10/2020 | Treacy et al. |
| 10,905,561 B2 | 2/2021 | Roche et al. |
| 2004/0167629 A1 | 8/2004 | Geremakis et al. |
| 2006/0155381 A1 | 7/2006 | Katzman |
| 2006/0173415 A1 | 8/2006 | Cummins |
| 2011/0029089 A1 | 2/2011 | Giuliani et al. |
| 2011/0060417 A1 | 3/2011 | Simmen et al. |
| 2016/0206436 A1 | 7/2016 | Chavarria et al. |
| 2021/0085474 A1 | 3/2021 | Courtney, Jr. et al. |

FOREIGN PATENT DOCUMENTS

| | | |
|---|---|---|
| EP | 0898946 | 3/1999 |
| EP | 3906897 | 11/2021 |
| WO | 03005933 | 1/2003 |
| WO | 03053280 | 7/2003 |
| WO | 2015103313 | 7/2015 |
| WO | 2022261508 | 12/2022 |

OTHER PUBLICATIONS

Product Brochure. Exactech | Shoulder Design Rationale. Equinoxe Platform Shoulder System—Humeral Reconstruction Prosthesis. Retrieve from: https://www.exac.com/wp-content/uploads/2022/04/718-08-40_Equinoxe_Humeral_Reconstruction_Prosthesis_Design-Rationale.pdf.

Product Brochure. Exactech | Shoulder Operative Technique. Equinoxe Shoulder System—Humeral Reconstruction Prosthesis. Retrieved from: https://www.exac.com/wp-content/uploads/2022/03/718-08-30_RevB_Humeral_Reconstruction_Prosthesis_Operative_Technique_Web.pdf.

Product Brochure. Design Rationale. Tornier Aequalis Flex Revive Shoulder System. Wright.

Product Brochure. Surgical Technique. Tornier Aequalis Flex Revive Shoulder System. Wright.

Product Brochure. Surgical Technique. Comprehensive Segmental Revision System. Zimmer Biomet.

European Search Report for European Patent Application No. 25155689.0 mailed Apr. 15, 2025.

International Preliminary Report on Patentability for International Application No. PCT/US2023/029605 mailed Mar. 20, 2025.

* cited by examiner

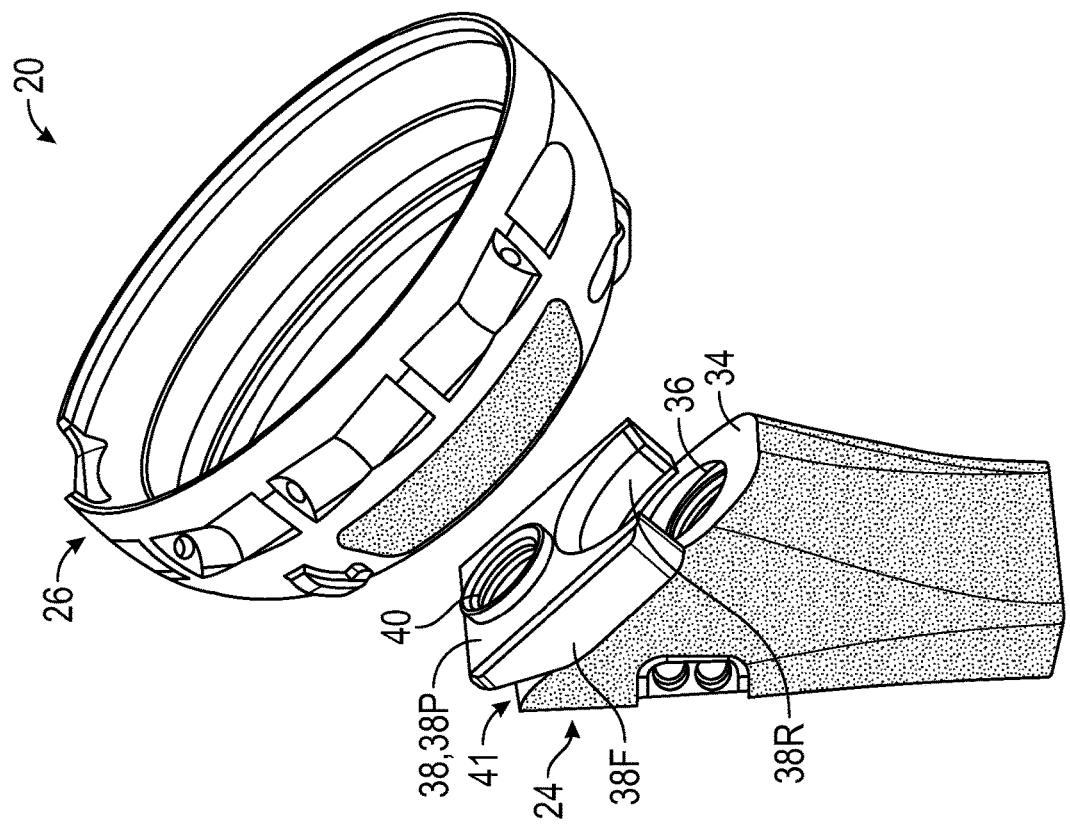
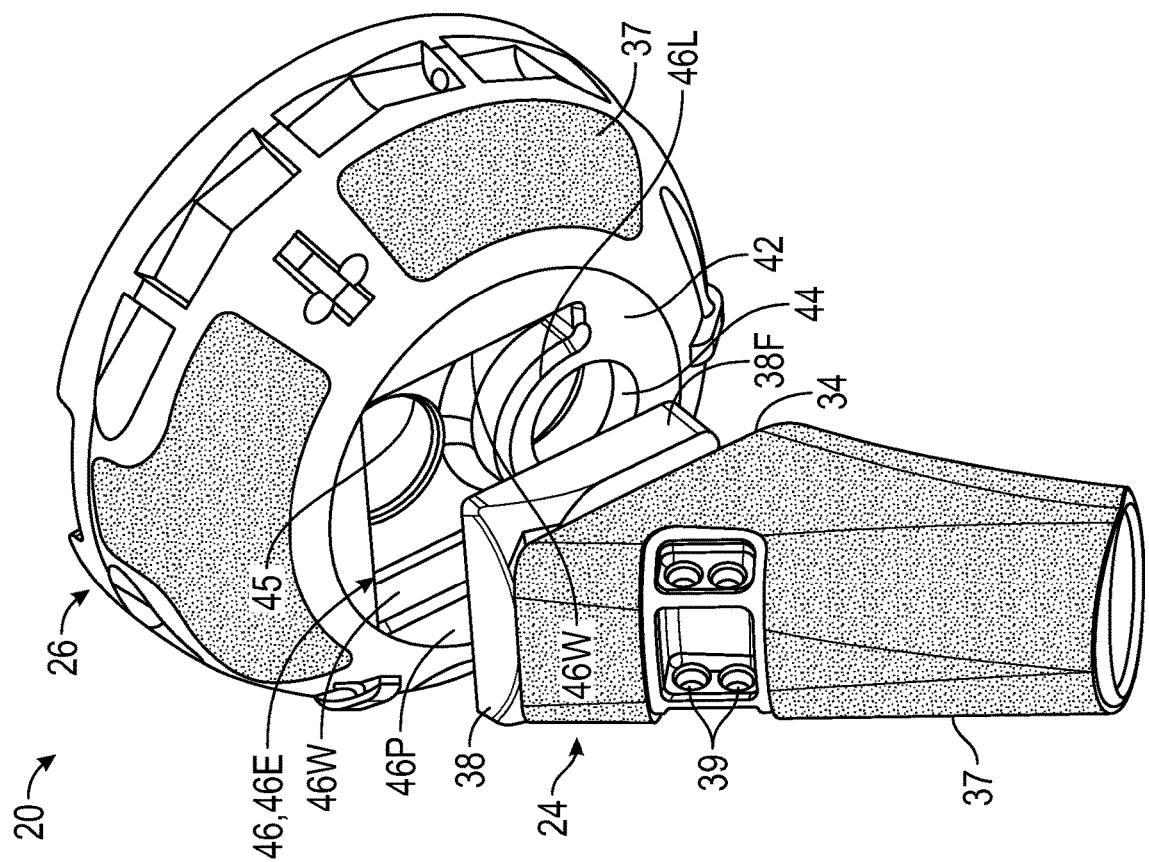

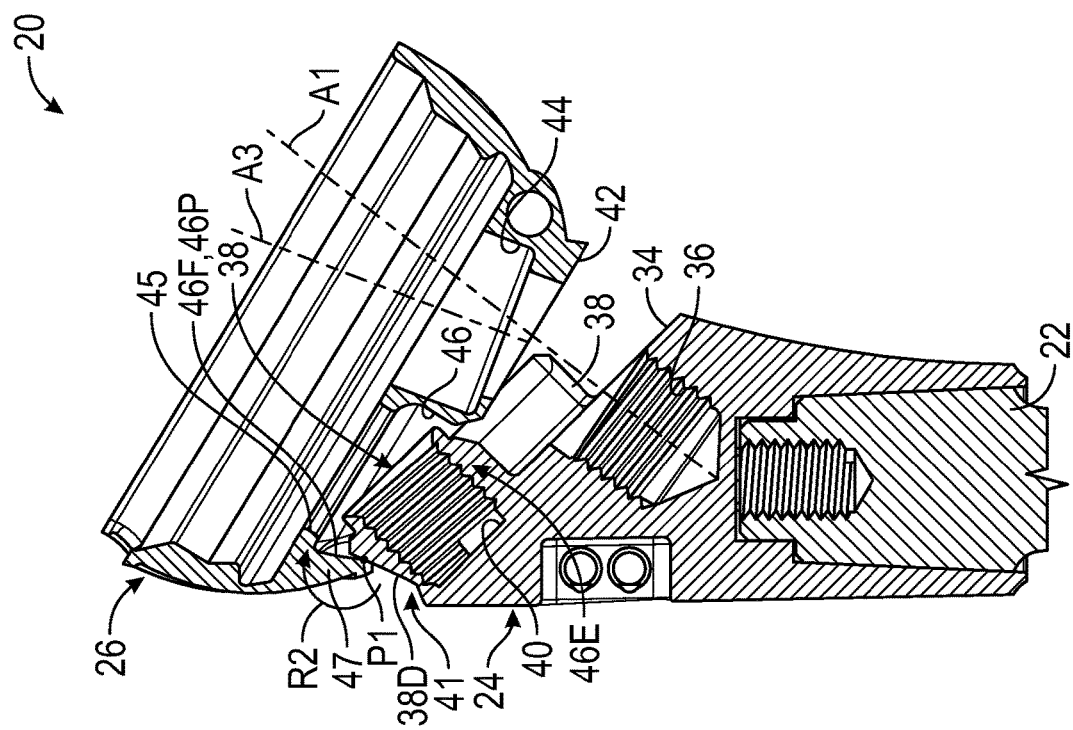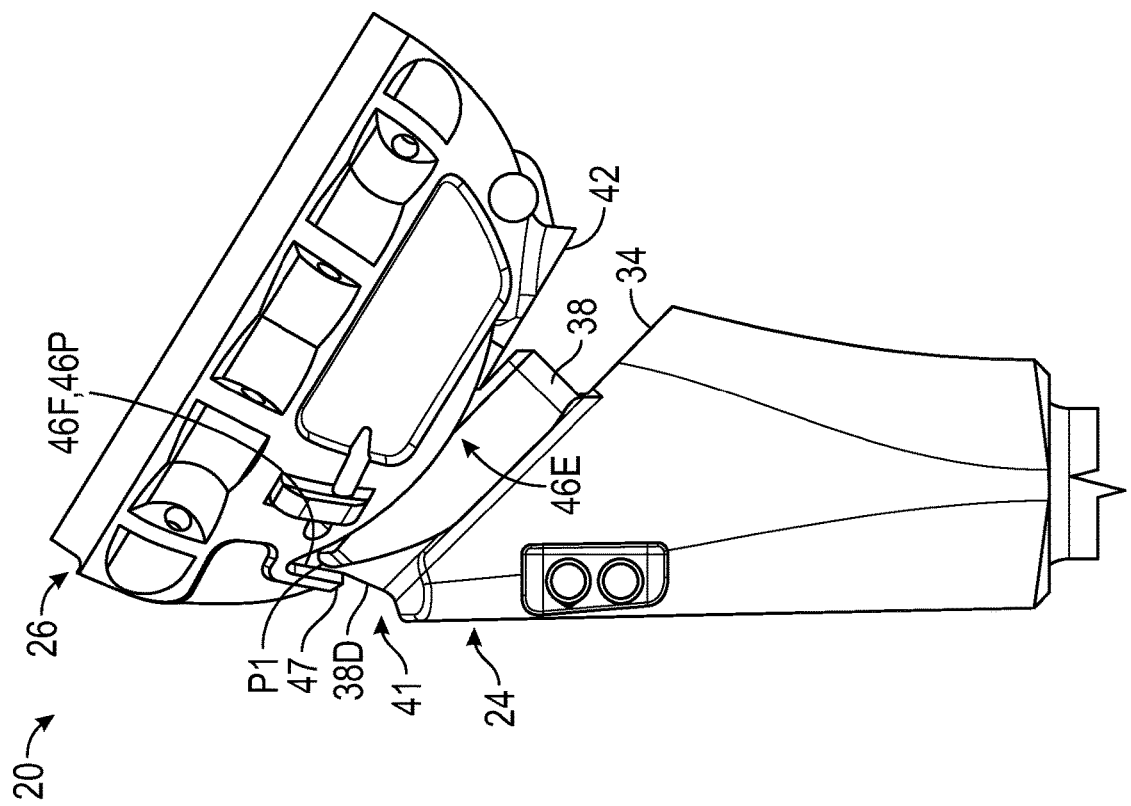

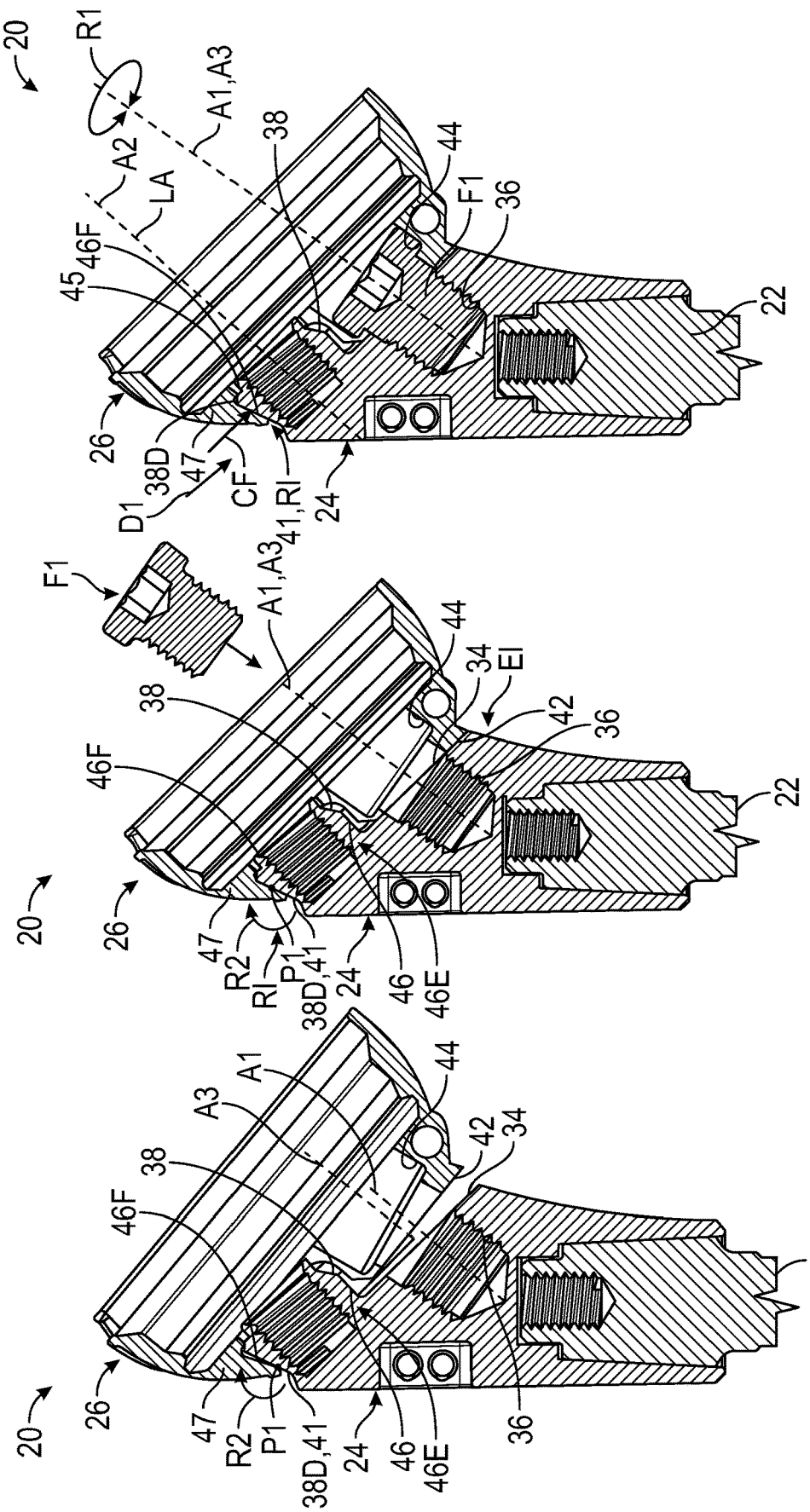

ORTHOPAEDIC IMPLANT SYSTEMS INCLUDING FIXATION FEATURES AND METHODS OF REPAIR

BACKGROUND

This disclosure relates to orthopaedic procedures and, more particularly, to orthopaedic implant systems and methods for repairing bone defects and restoring functionality to a joint.

Joints may be established by at least one long bone. The patient may experience loss caused by fracturing or shattering of the bone due to trauma. A prosthesis may be utilized to restore functionality to the bone. The prosthesis may include a stem insertable in a remainder of the bone and may include a head for mounting an articulation member to restore functionality to a joint.

SUMMARY

This disclosure relates to orthopaedic implant systems and methods for restoring functionality to a joint. The implant systems may include one or more fixation features for securing components of the implant systems to each other and/or adjacent tissue of a patient. The fixation features may include a taper locking mechanism to limit or otherwise oppose separation between components. The fixation features may include one or more flanges adapted to abut an exterior of the bone. The flange may be releasably securable to another component of the implant system and may be securable with one or more flexible constructs.

An orthopaedic implant system of the present disclosure may include a stem portion insertable into bone and a mounting portion extending from the stem portion. The mounting portion may include a first mounting bore extending inwardly from a first engagement face and a raised protrusion extending outwardly from the first engagement face. The raised protrusion may taper along a declined face toward the first engagement face. A head portion may be adapted to mount an articulation member. The head portion may include a head bore extending inwardly from a second engagement face and a recess extending inwardly from the second engagement face. A periphery of the recess may include an inclined face sloping towards an opening of the recess along the second engagement face. The raised protrusion may be insertable through the opening and into the recess such that the declined face and the inclined face may abut each other in an installed position. The first mounting bore may extend along a first mounting bore axis in a direction away from the raised protrusion such that the inclined face may move towards the first mounting bore axis to compress the inclined face against the declined face in response to securing a common fastener in the head bore and the first mounting bore.

A method of installing an orthopaedic implant system of the present disclosure may include inserting a stem portion into bone. A mounting portion may be coupled to the stem portion. The mounting portion may include a raised protrusion having a declined face. The method may include coupling a head portion to the mounting portion, which may include positioning the raised protrusion in a recess of the head portion and may include securing a fastener between the head portion and the mounting portion to cause the head portion to move across the mounting portion to compress an inclined face of the recess against the declined face of the raised protrusion.

An orthopaedic implant system of the present disclosure may include a head portion adapted to mount an articulation member. The articulation member may be configured to mate with an opposed articular surface. A stem portion may be insertable into bone. A collar portion may be adapted to interconnect the head portion and the stem portion. A flange portion may be releasably securable to the collar portion. The flange portion may include a flange body and at least one engagement flange that may be dimensioned to abut bone. The collar portion may include a channel dimensioned to at least partially receive the flange body. The flange portion may be moveable in a direction towards the collar portion to trap a portion of bone between the at least one engagement flange and the stem portion in response to fixing a length of a flexible construct that may couple the collar portion and the flange portion in an installed position.

A method of installing an orthopaedic implant system of the present disclosure may include inserting a stem portion into an intramedullary canal of a bone. The method may include inserting at least one interface flange of a flange portion into a channel of a collar portion. The collar portion may interconnect the stem portion and a head portion. The head portion may be adapted to mount an articulation member. The flange portion may include at least one engagement flange. The method may include trapping a wall of the bone between the stem portion and the at least one engagement flange in response to fixing a length of a flexible construct coupling the collar portion and the flange portion.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 illustrates an exploded view of a mounting portion and head portion of the implant system of FIG. 1.

FIG. 4 illustrates another exploded view of the mounting portion and head portion of FIG. 3.

FIG. 9 illustrates a side view of the head portion engaging the mounting portion at a first position.

FIG. 10 illustrates a sectional view of the head portion and mounting portion of FIG. 9.

FIG. 11 illustrates a sectional view of the head portion at an intermediate position relative to the mounting portion.

FIG. 12 illustrates a sectional view of the head portion at a second position relative to the mounting portion.

FIG. 13 illustrates a sectional view of the head portion coupled to the mounting portion at the second position with a fastener.

FIG. 19 illustrates a sectional view of a flexible construct.

DETAILED DESCRIPTION

Figure 1:
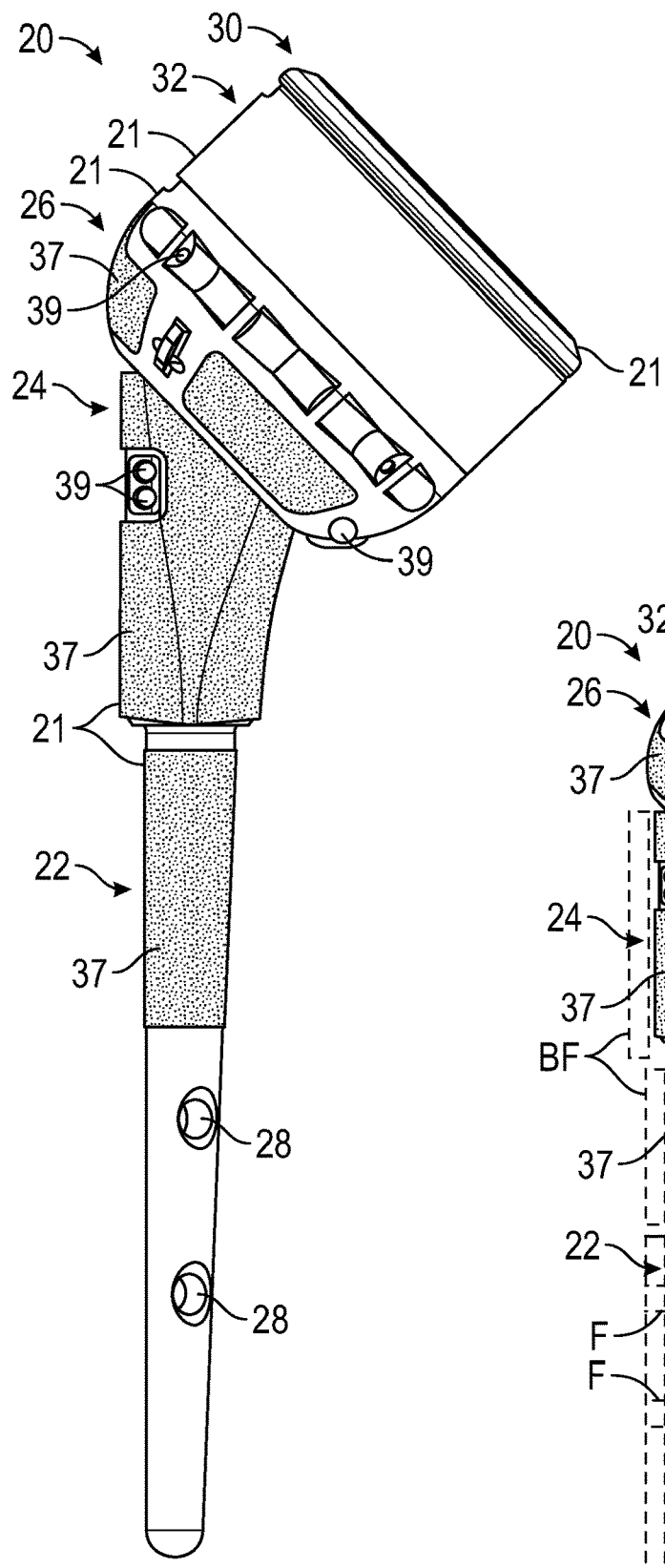
FIG. 1 illustrates a perspective view of an exemplary implant system.

This disclosure relates to orthopaedic implant systems and methods for repairing bone defects and restoring functionality to various joints. The disclosed implant systems described herein may include a modular prosthesis that may be adapted to facilitate reconstruction or repair of a long bone that may be caused by trauma to the patient. The long bone may have relatively severe proximal bone loss due to fracturing (e.g., 3 part or 4 part fractures) or shattering of the bone due to trauma, or a tumor in the bone, for example. Bone loss may be on the order of approximately one-third of the bone that may indicate a reconstruction procedure. The disclosed implant systems and methods may be utilized to restore functionality to a shoulder joint, including anatomical and reverse shoulder procedures.

The disclosed implant systems described herein may include a taper locking mechanism to secure adjacent portions of the implant system together in an installed position, such as a head portion and mounting portion of the implant system. The head portion may be adapted to mount an articulation member for mating with an opposed articular surface of a joint. The mounting portion may be coupled to a stem portion insertable into the humerus or other long bone. The taper locking mechanism may be adapted to limit or otherwise oppose separation between the head portion and mounting portion, which may improve healing of the patient.

The disclosed implant systems may include a flange portion securable to a collar portion or another portion of the implant system. The flange portion may be adapted to abut an exterior of the bone to promote torsional stability when the implant system is placed under torsional loads. The collar portion may be dimensioned to sit on a resected surface or prepared portion of the bone during reconstruction of the bone. The collar portion may be fixedly attached or otherwise secured to a stem portion insertable into the bone. The stem portion may be secured to the bone with one or more bone fasteners distally of the collar portion. One or more flexible constructs may be utilized to secure the flange portion and collar portion to each other at a specified distance to apply a compress force or load on the exterior of the bone, which may promote functionality of the restored joint and healing of the patient. Once a determined compression is achieved, a length or other dimension of the flexible construct and relative position between the collar and flange portions may be fixed. The flexible construct may be a length of suture configured into a loop about the collar and flange portions, for example.

An orthopaedic implant system of the present disclosure may include a stem portion insertable into bone and a mounting portion extending from the stem portion. The mounting portion may include a first mounting bore extending inwardly from a first engagement face and a raised protrusion extending outwardly from the first engagement face. The raised protrusion may taper along a declined face toward the first engagement face. A head portion may be adapted to mount an articulation member. The head portion may include a head bore extending inwardly from a second engagement face and a recess extending inwardly from the second engagement face. A periphery of the recess may include an inclined face sloping towards an opening of the recess along the second engagement face. The raised protrusion may be insertable through the opening and into the recess such that the declined face and the inclined face may abut each other in an installed position. The first mounting bore may extend along a first mounting bore axis in a direction away from the raised protrusion such that the inclined face may move towards the first mounting bore axis to compress the inclined face against the declined face in response to securing a common fastener in the head bore and the first mounting bore.

In implementations, the articulation member may be adapted to mate with an opposed articular surface of an adjacent implant or an adjacent bone.

In implementations, a maximum length of the raised protrusion may be greater than a minimum length of the opening.

In implementations, the second engagement face of the head portion may slide across the first engagement face in response to rotation of the common fastener about the first mounting bore axis.

In implementations, the first engagement face of the mounting portion may extend along a first reference plane. The first mounting bore axis may intersect the first reference plane to establish an acute first bore angle. The declined face of the raised protrusion may extend along a second reference plane. The second reference plane may intersect the first reference plane to establish an acute ramp angle. The ramp angle may be less than the first bore angle.

In implementations, the raised protrusion may include a second mounting bore extending along a second mounting bore axis. The second mounting bore may be dimensioned to receive a fastener to secure an adapter to the mounting portion. The adapter may be adapted to interconnect the head portion and the articulation member.

In implementations, the second mounting bore axis may intersect the first reference plane to establish a second bore angle. The second bore angle may differ from the first bore angle and may differ from the ramp angle.

In implementations, the head portion may include a pair of walls interconnecting the inclined face and an arcuate lip to establish the periphery of the recess. The pair of walls may oppose each other on opposite sides of the head bore. The arcuate lip may be opposed to the inclined face and may be dimensioned to follow a perimeter of the head bore. The mounting portion may include a pair of faces on opposite sides of the raised protrusion. The declined face may interconnect the pair of faces. The pair of faces may be dimensioned to engage the respective pair of walls to limit relative movement between the head portion and the mounting portion in the installed position.

A method of installing an orthopaedic implant system of the present disclosure may include inserting a stem portion into bone. A mounting portion may be coupled to the stem portion. The mounting portion may include a raised protrusion having a declined face. The method may include coupling a head portion to the mounting portion, which may include positioning the raised protrusion in a recess of the head portion and may include securing a fastener between the head portion and the mounting portion to cause the head portion to move across the mounting portion to compress an inclined face of the recess against the declined face of the raised protrusion.

In implementations, the method may include securing an articulation member to the head portion. The articulation member may be adapted to mate with an opposed articular surface of an adjacent implant or an adjacent bone.

In implementations, the method may include positioning one or more bone fragments about a periphery of the mounting portion.

In implementations, the step of securing the fastener may include positioning the fastener through a head bore of the head portion and then into a first mounting bore of the mounting portion. The first mounting bore may extend inwardly from a first engagement face of the mounting portion. The raised protrusion may extend outwardly from the first engagement face. The head bore may extend inwardly from a second engagement face. The step of coupling the head portion to the mounting portion may occur such that the first and second engagement faces abut each other. The first engagement face may extend along a first reference plane. The declined face of the raised protrusion may extend along a second reference plane intersecting the first reference plane to establish an acute ramp angle. The first mounting bore may extend along a first mounting bore axis intersecting the first reference plane to establish an acute first bore angle. The ramp angle may be less than the first bore angle.

In implementations, the head portion may include an opening to the recess. The opening may be dimensioned to receive the raised protrusion. A maximum length of the raised protrusion may be greater than a minimum length of the opening.

In implementations, the step of coupling the head portion to the mounting portion may include establishing a pivot point between a periphery of the recess and the declined face, and then pivoting the head portion about the pivot point in a direction towards the mounting portion such that the raised protrusion may pass through the opening and may be captured in the recess.

An orthopaedic implant system of the present disclosure may include a head portion adapted to mount an articulation member. The articulation member may be configured to mate with an opposed articular surface. A stem portion may be insertable into bone. A collar portion may be adapted to interconnect the head portion and the stem portion. A flange portion may be releasably securable to the collar portion. The flange portion may include a flange body and at least one engagement flange that may be dimensioned to abut bone. The collar portion may include a channel dimensioned to at least partially receive the flange body. The flange portion may be moveable in a direction towards the collar portion to trap a portion of bone between the at least one engagement flange and the stem portion in response to fixing a length of a flexible construct that may couple the collar portion and the flange portion in an installed position.

In implementations, the flexible construct may be dimensioned to loop about a longitudinal axis of the collar portion in the installed position.

In implementations, the collar portion may include at least one collar passage dimensioned to receive a respective length of the flexible construct.

In implementations, the flange body may include one or more flange passages dimensioned to receive a respective length of the flexible construct.

In implementations, the channel may extend about a periphery of the collar portion. The channel, the at least one collar passage and the one or more flange passages may be at least partially aligned along an arc path in the installed position.

In implementations, the flexible construct may be dimensioned to loop about the longitudinal axis of the collar portion in the installed position.

In implementations, the flexible construct may comprise a length of suture.

In implementations, the flange body may include a first interface flange and a second interface flange insertable into respective portions of the channel.

In implementations, the first interface flange and the second interface flange may include a respective set of grooves. The collar portion may include a plurality of bores each aligned with a selected groove of the set of grooves in the installed position. A plurality of fasteners may be dimensioned to extend through the respective bores to engage the selected groove to secure the flange portion and the collar portion to each other in the installed position.

In implementations, the collar portion may include a collar passage interconnecting first and second segments of the channel to establish a securement path.

In implementations, the at least one engagement flange may include a first engagement flange and a second engagement flange. The flange body may include first and second flange passages that establish the securement path. The first and second flange passages may be established at respective junctions between the flange body and the first and second engagement flanges.

In implementations, the flange portion may include a third flange passage adjacent a free end of the first interface flange and a fourth flange passage adjacent a free end of the second interface flange. The collar passage may be situated along a segment of the securement path between the third flange passage and the fourth flange passage in the installed position.

In implementations, the stem portion may include at least one fixation bore spaced apart from the collar portion in the installed position. The at least one fixation bore may be dimensioned to receive a respective bone fastener that may extend through the bone in the installed position.

A method of installing an orthopaedic implant system of the present disclosure may include inserting a stem portion into an intramedullary canal of a bone. The method may include inserting at least one interface flange of a flange portion into a channel of a collar portion. The collar portion may interconnect the stem portion and a head portion. The head portion may be adapted to mount an articulation member. The flange portion may include at least one engagement flange. The method may include trapping a wall of the bone between the stem portion and the at least one engagement flange in response to fixing a length of a flexible construct coupling the collar portion and the flange portion.

In implementations, the flexible construct may comprise a length of suture.

In implementations, the method may include passing the flexible construct through at least one collar passage of the collar portion and through at least one flange passage of the flange portion prior to the fixing step.

In implementations, the method may include looping the flexible construct around a circumference of the collar portion and through the flange portion, and then tensioning the flexible construct prior to the fixing step.

In implementations, the stem portion may include at least one fixation bore. The method may include positioning a bone fastener through the at least one fixation bore and into the bone prior to the fixing step.

Figure 2:
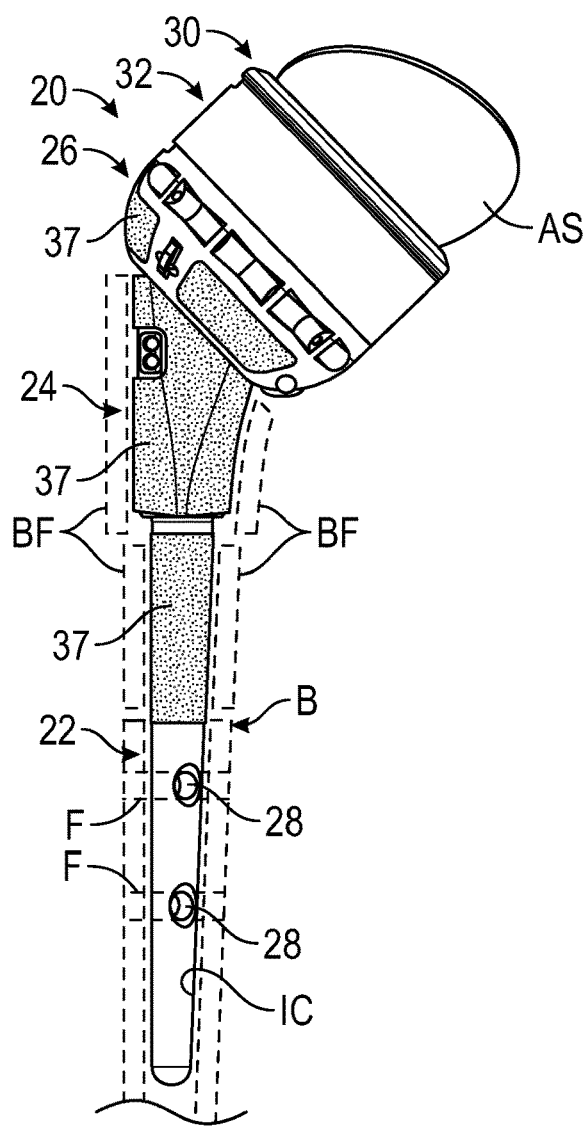
FIG. 2 illustrates a perspective view of the implant system adjacent to an articular surface and secured to bone.

FIGS. 1 and 2 illustrate an orthopaedic implant system (e.g., assembly) 20. The implant system 20 may be utilized in various orthopedic procedures to restore functionality to bones and/or joints such as a shoulder joint during an anatomical or reverse shoulder arthroplasty. The implant system 20 may be utilized to restore functionality to one or more bones in a fractured or shattered condition. The implant system 20 may be utilized to restore functionality to long bones and other bones such as a humerus or femur. The implant system 20 may be utilized to restore functionality to other bones and joints such as a knee, hip, elbow, wrist or ankle.

The implant system 20 can include one or more components 21. The components 21 may be fixedly attached or otherwise secured to each other (see also FIG. 5). In implementations, one or more or each of the components 21 can be integrally formed with each other to establish the implant system 20.

The components 21 of the implant system 20 can include a first (e.g., stem) portion 22, a second (e.g., mounting) portion 24 and a third (e.g., head or cup) portion 26. In the implementation of FIG. 3, the stem portion 22 can be insertable into bone B (shown in dashed lines). The stem portion 22 can include one or more fixation bores 28. The fixation bore 28 can be dimensioned to receive a respective fastener F. The fastener F can be dimensioned to extend through the bone B in an installed position to secure the stem portion 22.

Figure 5:
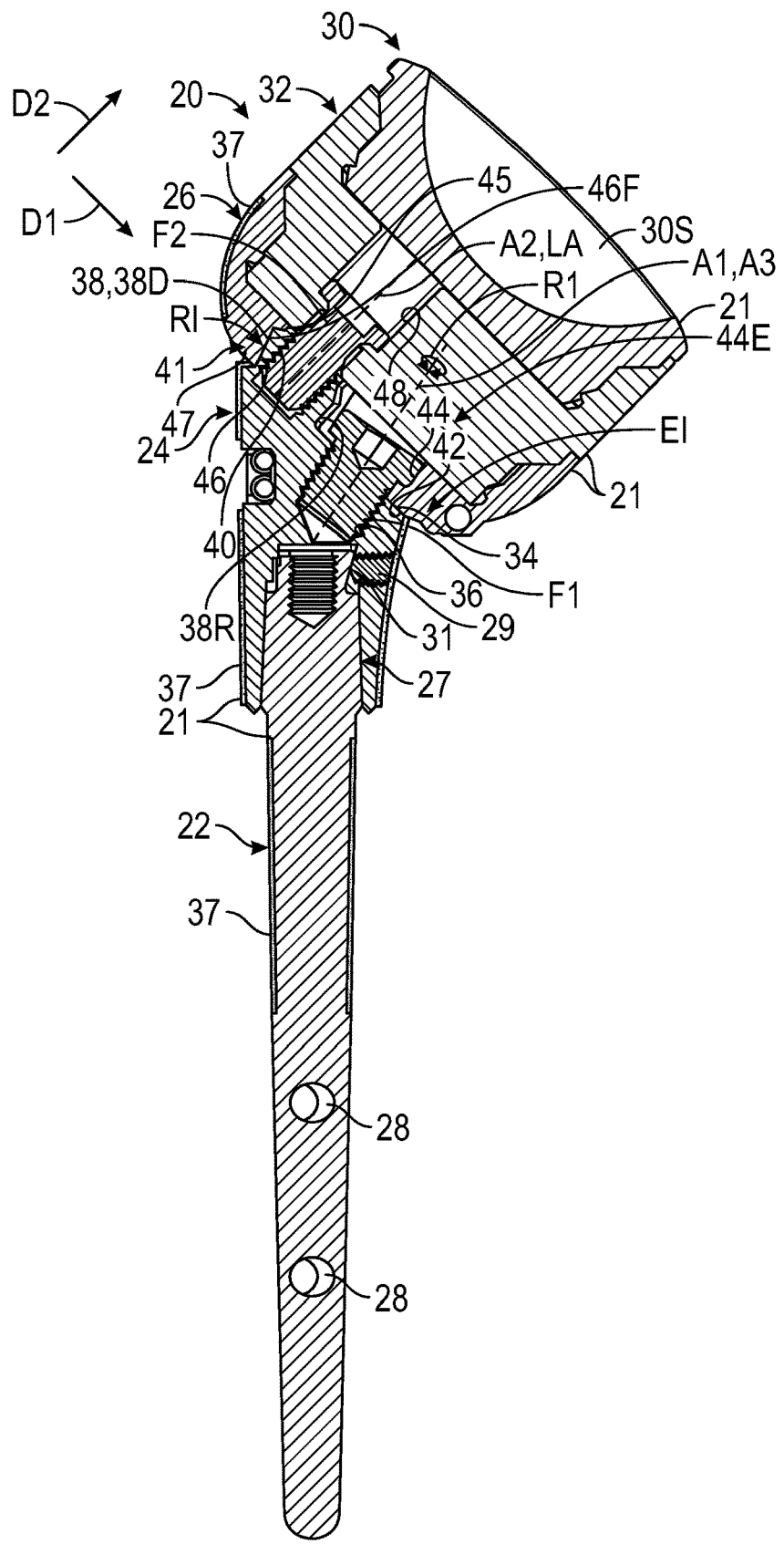
FIG. 5 illustrates a sectional view of the implant system of FIG. 1.

The mounting portion 24 may extend from, and may be coupled to, the stem portion 22 utilizing various techniques. In the implementation of FIG. 5, the mounting portion 24 may be coupled to the stem portion 22 utilizing a Morse taper connection 27 and/or a fastener 29 such as a locking screw dimensioned to engage a ramped face 31 adjacent a proximal end of the stem portion 22. The Morse taper connection 27 can serve to limit relative axial and/or rotational movement between the stem portion 22 and mounting portion 24. The fastener 29 may serve to limit relative axial movement between the stem portion 22 and mounting portion 24. Various fasteners may be utilized to secure any of the components of the implant systems disclosed herein, including threaded bolts, pins, rivets, clips, etc.

The implant system 20 can include an articulation member (e.g., liner) 30. The articulation member 30 can have an articulation surface 30S (FIG. 5) adapted to mate with an opposed the articular surface AS (FIG. 2). The articulation surface 30S may have a generally concave geometry (see, e.g., FIG. 5) or a generally convex geometry (see, e.g., FIGS. 14-15). The articular surface AS can be established by an adjacent implant or an adjacent bone of an associated joint. The articular surface AS may have a generally convex geometry (e.g., FIG. 2) or a generally concave geometry (see, e.g., FIG. 15). The head portion 26 can be adapted to mount or otherwise secure the articulation member 30. The head portion 26 can interconnect the stem portion 22 and/or mounting portion 24 with the articulation member 30.

The implant system 20 may include an adapter (e.g., spacer) 32 adapted to interconnect or otherwise secure the head portion 26 and articulation member 30 to each other. The implant system 20 may include a set of adapters 32 of various geometries to space apart and/or orient the head portion 26 and the articulation member 30 relative to each other. In other implementations, the adapter 32 can be integrally formed with the head portion 26 and/or articulation member 30. In implementations, the adapter 32 may be omitted, and the articulation member 30 may be mounted or otherwise secured directly to the head portion 26.

The implant system 20 can include various features to interact with surrounding bone or other tissue, including one or more surface treatment(s) 37. The surface treatments 37 can be established along one or more surfaces of the components 21. The surface treatments 37 can include a porous construct or scaffold established in a thickness of the component 21 or can be one or more porous layers of material disposed on a surface of the component 21 to promote fixation with adjacent bone or other tissue. The implant system 20 can include one or more passages (e.g., eyelets) 39. Each passage 39 can be dimensioned to receive a length of suture to secure bone and/or soft tissue to the implant system 20. In implementations, the surface treatments 37 and/or passages 39 may be omitted.

Referring to FIGS. 3 and 4, with continuing reference to FIGS. 1 and 2, the implant system 20 can include one or more features adapted to secure the components 21 to each other, such as the mounting portion 24 and head portion 26. The mounting portion 24 can include a first engagement surface (e.g., face) 34, a first mounting bore 36 (FIG. 4) and a raised protrusion (e.g., boss) 38. The first engagement face 34 can be generally or substantially planar. For the purposes of this disclosure, the terms "about," "approximately" and "substantially" mean±10 percent of the stated value or relationship unless otherwise stated. The first mounting bore 36 may be dimensioned to extend inwardly from the first engagement face 34 of the mounting portion 24.

The raised protrusion 38 may extend outwardly from the first engagement face 34 of the mounting portion 24. The raised protrusion 38 may be spaced apart from the first mounting bore 36 relative to the first engagement face 34. The raised protrusion 38 may include a second mounting bore 40 (FIG. 4). The second mounting bore 40 may be established along a proximal face 38P of the raised protrusion 38. The proximal face 38P may extend along a free end of the raised protrusion 38. In other implementations, the second mounting bore 40 may be omitted.

The head portion 26 may include a second engagement surface (e.g., face) 42 for engaging the first engagement face 34. The second engagement face 42 can be generally or substantially planar. The first engagement face 34 and second engagement face 42 may be dimensioned to mate with or otherwise contact each other to establish an engagement interface EI between the first engagement face 34 and second engagement face 42 in the installed position, as illustrated in FIG. 5. The second engagement face 42 may be dimensioned to sit on the first engagement face 34 in the installed position.

The head portion 26 may include a head bore 44 and a recess 46, as illustrated in FIG. 3. The head bore 44 and recess 46 may be spaced apart from each other relative to the second engagement face 42 of the head portion 26. The head bore 44 and recess 46 may be dimensioned to extend inwardly from the second engagement face 42. The adapter 32 may be dimensioned to at least partially or completely block an opening (e.g., entrance) 44E of the head bore 44 in the installed position (see, e.g., FIG. 5).

Referring to FIG. 5, with continuing reference to FIGS. 3 and 4, the first mounting bore 36 can be dimensioned to extend along a first mounting bore axis A1. The second mounting bore 40 of the raised protrusion 38 can be dimensioned to extend along a second mounting bore axis A2. A longitudinal axis LA of the raised protrusion 38 may coincide with, or may otherwise be substantially parallel to, the second mounting bore axis A2 of the second mounting bore 40. In other implementations, the second mounting bore axis A2 and longitudinal axis LA of the raised protrusion 38 may be transverse to each other. The head bore 44 of the head portion 26 can be dimensioned to extend along a head bore axis A3.

The first mounting bore 36 and the head bore 44 can be dimensioned to receive a first (e.g., common) fastener F1 to secure the mounting portion 24 and head portion 26 to each other in the installed position. In implementations, the first mounting bore axis A1 of the first mounting bore 36 and head bore axis A3 of the head bore 44 can be substantially aligned with each other along engagement interface EI to receive the fastener F1 in the installed position.

The adapter 32 can include an adapter (e.g., spacer) bore 48 for securing the adapter 32 and mounting portion 24 to each other. The head portion 26 can include a second head bore 45 (see also FIG. 3). The second mounting bore 40, second head bore 45 and adapter bore 48 can be dimensioned to receive a second (e.g., common) fastener F2 in the installed position. The second mounting bore 40, second head bore 45 and adapter bore 48 may be substantially aligned with each other along the second mounting bore axis A2 to receive the common fastener F2 to secure the adapter 32 and mounting portion 24 to each other in the installed position. In implementations, the fastener F2 may be secured in the second mounting bore 40, second head bore 45 and adapter bore 48 subsequent to securing the fastener F1 in the first mounting bore 36 and head bore 44. The axis A2 of the second mounting bore 40 and an axis of the second head bore 45 may be misaligned prior to securing the fastener F1 (see, e.g., FIG. 10) and may be substantially aligned in response to securing the fastener F1 (see, e.g., FIG. 13).

Figure 6:
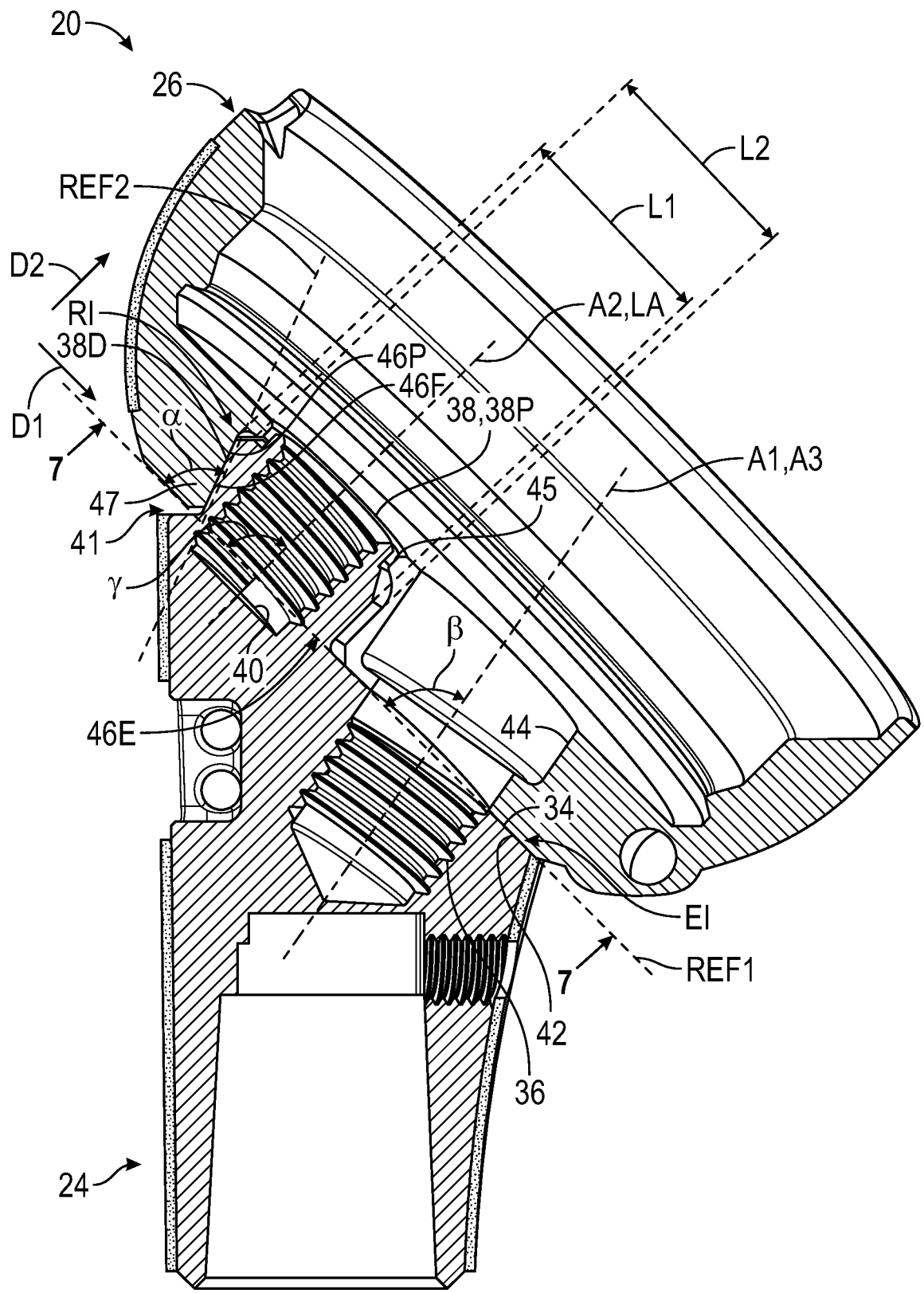
FIG. 6 illustrates a sectional view of the mounting portion and head portion of FIG. 1.

Referring to FIG. 6, with continuing reference to FIGS. 3-5, the implant system 20 can include one or more fixation features to lock or otherwise secure the mounting portion 24 and head portion 26 to each other. The fixation may be established under a compressive load or force in a non-perpendicular direction relative to the first engagement face 34. The first engagement face 34 of the mounting portion 24 can be dimensioned to extend along a first reference plane REF1 (shown in dashed lines). The raised protrusion 38 can be dimensioned to extend outwardly (e.g., proximally) from the first reference plane REF1.

The mounting portion 24 and head portion 26 may cooperate to establish a taper locking mechanism for improving fixation of the head portion 26. The raised protrusion 38 of the mounting portion 24 and the recess 46 of the head portion 26 may be dimensioned to establish the taper locking mechanism. The raised protrusion 38 can include a first (e.g., declined) face 38D dimensioned to contact the head portion 26. The declined face 38D may be established along a periphery of the raised protrusion 38. The raised protrusion 38 may be dimensioned to taper along the declined face 38D from a proximal face (e.g., free end) 38P of the raised protrusion 38 toward the first engagement face 34 and/or first reference plane REF1 such that a cross-sectional area of the raised protrusion 38 decreases in a direction from the proximal face 38P towards the first reference plane REF1 to establish a generally wedge-shaped engagement recess 41. The raised protrusion 38 may be dimensioned to flare outwardly from the first engagement face 34 and/or first reference plane REF1 such that the cross-sectional area of the raised protrusion 38 increases in a direction away from the first reference plane REF1 towards the proximal face 38P of the raised protrusion 38. The declined face 38D may be generally or substantially planar. The declined face 38D may extend along a second reference plane REF2 (shown in dashed lines). The declined face 38D of the raised protrusion 38 can be dimensioned such that the second reference plane REF2 intersects the first reference plane REF1 to establish a ramp angle α. In implementations, the ramp angle α may be an acute angle. The ramp angle α may be less than 90 degrees and/or greater than or equal to 45 degrees. In other implementations, the ramp angle α is greater than or equal to 90 degrees.

The first mounting bore axis A1 may be dimensioned to intersect the first reference plane REF1 to establish a first bore angle β. In implementations, the first bore angle β may be an acute angle. The first bore angle β may be less than 90 degrees and/or greater than or equal to 45 degrees. In implementations, the first bore angle β is greater than or equal to 70 degrees, such as approximately 80 degrees. The ramp angle α may be less than or equal to the first bore angle β relative to the first reference plane REF1. In other implementations, the ramp angle α may be greater than the first bore angle β.

The head portion 26 can include a second (e.g., inclined) face 46F dimensioned to engage the declined face 38D of the raised protrusion 38 in the installed position. The inclined face 46F may be established by a wall of the head portion 26. In implementations, the inclined face 46F can extend along and bound a periphery 46P of the recess 46. The head portion 26 can include a generally-wedge shaped engagement lip 47 that may establish a portion of the periphery 46P of the recess 46. The inclined face 46F may be dimensioned to slope along the engagement lip 47 towards an opening (e.g., entrance) 46E of the recess 46 along the second engagement face 42. The engagement lip 47 may be dimensioned to be at least partially received in the engagement recess 41. In implementations, the engagement recess 41 is dimensioned to substantially follow a contour of the engagement lip 47 such that the engagement lip 47 is wedged against the declined face 38D in the installed position.

The raised protrusion 38 may be insertable through the opening 46E and into the recess 46 such that the declined face 38D and the inclined face 46F abut each other to establish a ramped interface RI in the installed position. The ramped interface RI may be separate and distinct from the engagement interface EI.

The raised protrusion 38 and the recess 46 of the head portion 26 can be dimensioned such that the inclined face 46F binds or compresses against the declined face 38D in response to at least partially or completely securing the fastener F1 in the first mounting bore 36 and the head bore 44, as illustrated in FIG. 5. The first mounting bore 36 may be dimensioned to extend along the first mounting bore axis A1 in a direction away from the raised protrusion 38 such that the inclined face 46F moves in a first direction D1 (e.g., sideways) towards the first mounting bore axis A1 to cause the inclined face 46F to bind or compress against the declined face 38D in response to securing the common fastener F1 in the first mounting bore 36 and head bore 44. In implementations, the ramp angle α can be less than the first bore angle β such that the inclined face 46F moves in the first direction D1 towards the first mounting bore axis A1 to bind or compress the inclined face 46F against the declined face 38D in response to securing the common fastener F1. In implementations, the second engagement face 42 of the head portion 26 can be dimensioned to slide in the first direction D1 across the first engagement face 34 in response to rotation of the common fastener F1 in a rotational direction R1 about the first mounting bore axis A1 such that the common fastener F1 translates along the first mounting bore axis A1, as illustrated in FIG. 5. The acute ramp angle α can serve to cause the raised protrusion 38 to oppose movement of the head portion 26 in a second direction D2 (FIG. 5) away from the first reference plane REF1 in the installed position. In implementations, the first direction D1 may be substantially perpendicular or otherwise transverse to the second mounting bore axis A2 of the second mounting bore 40. The first direction D1 may be substantially parallel to the first reference plane REF1 and/or oblique to the first mounting bore axis A1 of the first mounting bore 36. The second direction D2 can be substantially perpendicular to the first direction D1, first engagement face 34 and/or first reference plane REF1.

The second mounting bore 40 can be dimensioned relative to the first mounting bore 36 and/or declined face 38D to improve fixation of the head portion 26. The second mounting bore axis A2 of the second mounting bore 40 can be dimensioned to intersect the first reference plane REF1 to establish a second bore angle γ. The second bore angle γ may be the same, or may differ from, the ramp angle α and/or first bore angle β. In implementations, the second bore angle γ differs from both the ramp angle α and first bore angle β. The second mounting bore 40 may be dimensioned such that second bore angle γ can be substantially perpendicular to the first reference plane REF1.

Figure 7:
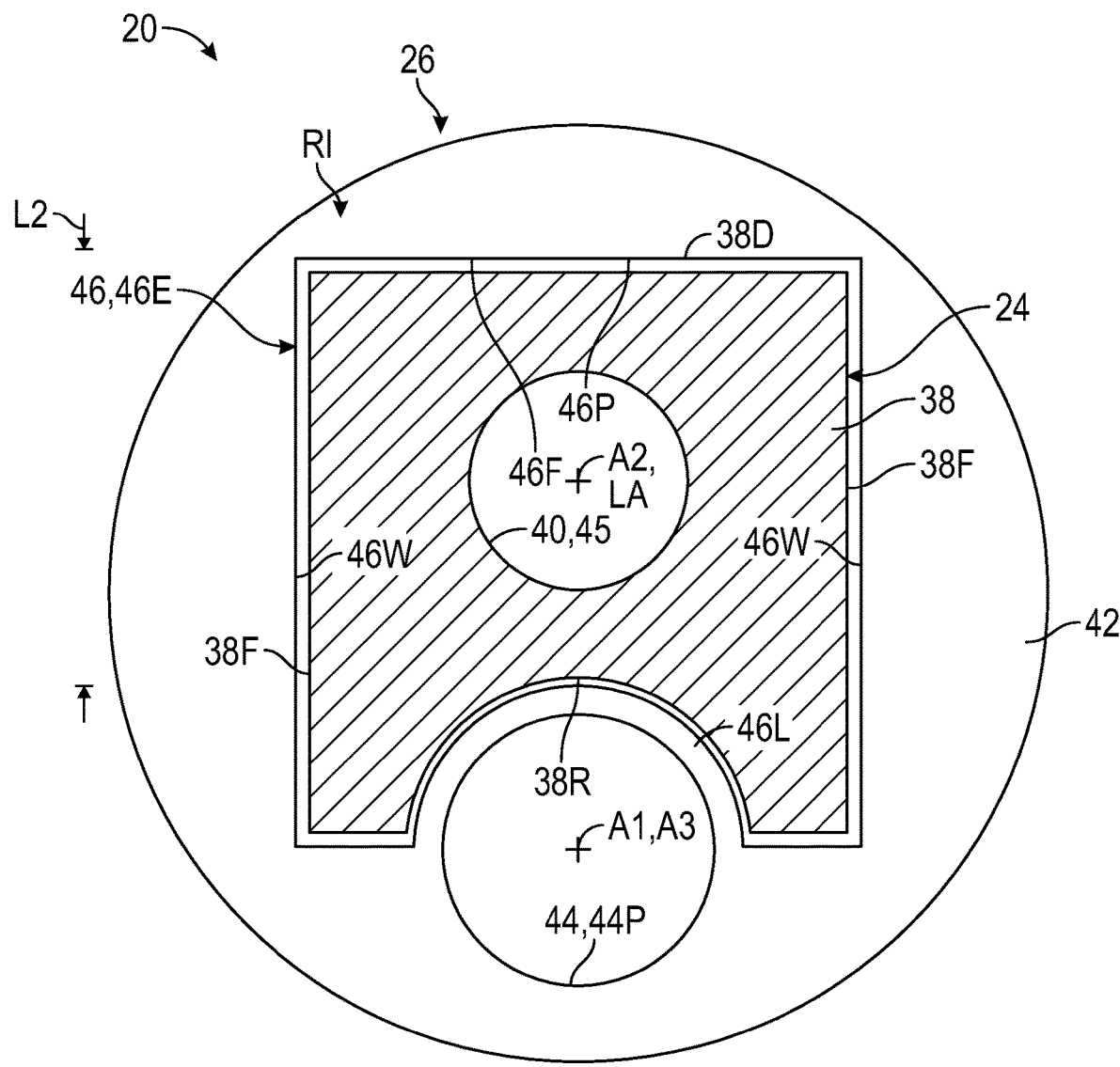
FIG. 7 illustrates a sectional view of the mounting portion taken through line 7-7 of FIG. 6.

Referring to FIG. 7, with continuing reference to FIGS. 3-4 and 6, the raised protrusion 38 and recess 46 can be dimensioned to limit relative movement between the mounting portion 24 and head portion 26 with respect to the first reference plane REF1. The head portion 26 can include a pair of walls 46W interconnecting the inclined face 46F and an arcuate lip 46L to establish the periphery 46P of the recess 46. The pair of walls 46W can be dimensioned to oppose each other on opposite sides of the head bore 44. The walls 46W can be substantially planar. The walls 46W can be substantially parallel or transverse to each other. The arcuate lip 46L can be dimensioned to extend towards and be opposed to the inclined face 46F. The arcuate lip 46L can be dimensioned to follow a perimeter 44P of the head bore 44. The walls 46W, inclined face 46F and arcuate lip 46L may cooperate to establish the entrance 46E of the recess 46.

The raised protrusion 38 can include a recess 38R dimensioned to at least partially receive the arcuate lip 46L. The declined face 38D and recess 38R can be established on opposite sides of the raised protrusion 38. A periphery of the recess 38R can be dimensioned to substantially follow a contour of the arcuate lip 46L. The raised protrusion 38 can be dimensioned such that the periphery of the recess 38R is spaced apart from the arcuate lip 46L in response to movement of the head portion 26 in the first direction D1, as illustrated in FIG. 5.

The mounting portion 24 can include a pair of faces (e.g., abutments) 38F. The declined face 38D of the raised protrusion 38 can be dimensioned to interconnect the faces 38F. The faces 38F can be dimensioned to be on opposite sides of the raised protrusion 38. The faces 38F can be substantially planar. The faces 38F can be substantially parallel or transverse to each other. The walls 46W of the recess 46 can be dimensioned to substantially follow a geometry of the respective faces 38F. The faces 38F can be dimensioned to engage the respective walls 46W of the recess 46 to limit relative movement between the head portion 26 and the mounting portion 24 in the installed position.

The entrance 46E of the recess 46 can be dimensioned to capture the raised protrusion 38 in the recess 46 to limit movement of the head portion 26 in the second direction D2 (FIG. 5) away from the mounting portion 24 in the installed position. The entrance 46E may be dimensioned to block insertion of the raised protrusion 38 into the recess 46 in response to movement of the head portion 26 in a direction substantially parallel to the longitudinal axis LA of the raised protrusion 38. A thickness of the raised protrusion 38 may be dimensioned to taper in a direction from the proximal face 38P towards the first engagement face 34 to facilitate insertion of the raised protrusion 38 through the entrance 46E at an oblique angle. A maximum (e.g., first) length L1 may be established across the raised protrusion 38 (FIG. 6). The maximum length L1 may be established by the proximal face 38P of the raised protrusion 38. A minimum (e.g., second) length L2 may be established across the entrance 46E of the recess 46R (FIGS. 6-7). The maximum length L1 of the raised protrusion 38 can be greater than the minimum length L2 of the entrance 46E of the recess 46R to capture the head portion 26. The recess 46 can be dimensioned such that the head portion 26 is pivotable about the raised protrusion 38 to capture the raised protrusion 38 at least partially or substantially in the recess 46 in the installed position.

Figure 8:
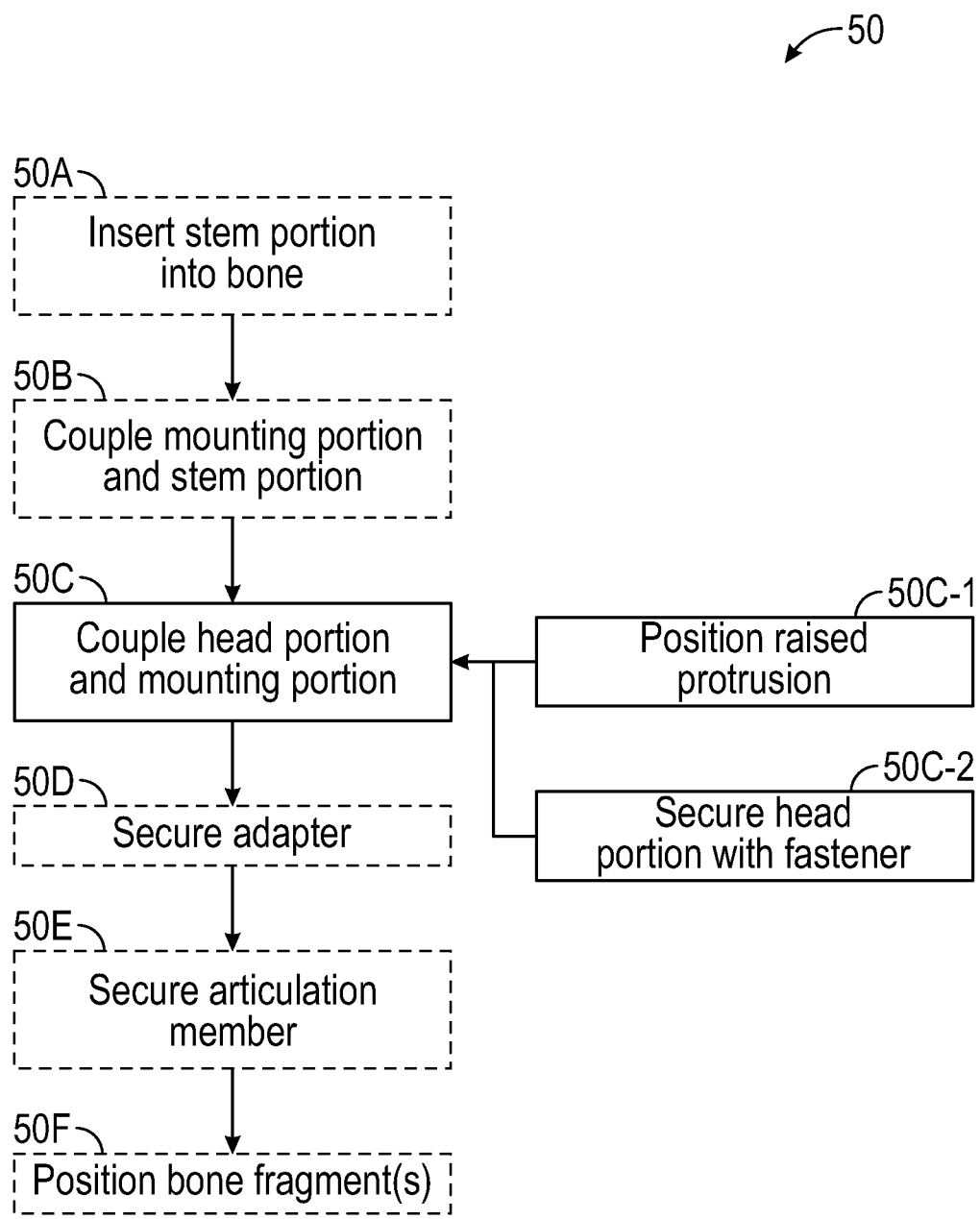
FIG. 8 illustrates an exemplary method of installing an orthopaedic implant system.

FIG. 8 illustrates a method of installing an orthopedic implant system in flow chart 50 according to implementation. The method 50 may be utilized to perform an arthroplasty to restore functionality to a bone and/or joint, including any of the bones and joints disclosed herein. In implementations, the method 60 can be utilized in repair of a fractured proximal humerus. The method 50 may be utilized in an anatomical shoulder or reverse shoulder arthroplasty. The method 50 can be utilized in accordance with any of the implant systems disclosed herein, including the implant system 20. Reference is made to the implant system 20 for illustrative purposes. Fewer or additional steps than are recited below could be performed within the scope of this disclosure, and the recited order of steps is not intended to limit this disclosure.

The disclosed implant systems may be provided to the surgeon as a kit. The kit may include components of various shapes and sizes. The particular components may be selected from the kit to establish a specified configuration of the implant system according to an anatomy of the patient and other aspects of a surgical plan.

Referring to FIG. 2, with continuing reference to FIG. 8, at step 50A the stem portion 22 can be at least partially inserted into a recess of a bone B, such as an intramedullary canal IC. The stem portion 22 and mounting portion 24 can be coupled to each other at step 50B. In other implementations, the stem portion 22 and mounting portion 24 are integrally formed with each other and step 50B can be omitted.

At step 50C, the mounting portion 24 and head portion 26 can be coupled to each other. Referring to FIG. 9, with continuing reference to FIG. 8, step 50C can include positioning the raised protrusion 38 at least partially in the recess 46 of the head portion 26. Step 50C can include positioning the raised protrusion 38 in the recess 46 of the head portion 26 at step 50C-1. Coupling the mounting portion 24 and head portion 26 to each other at step 50C can occur such that the first engagement face 34 and second engagement face 42 abut each other in the installed position. In implementations, the components 21 of the implant system 20 are assembled together prior to situating the stem portion 22 in the bone B at step 50A, including the stem portion 22, mounting portion 24 and head portion 26.

Referring to FIG. 9, with continuing reference to FIGS. 5-6 and 8, step 50C-1 can include establishing a pivot (e.g., hinge) point P1 between the periphery 46P of the recess 46 and the declined face 38D of the raised protrusion 38 at a first position. Referring to FIGS. 10-11, with continuing reference to FIGS. 5-6 and 8-9, step 50C-1 can include progressively pivoting the head portion 26 in a rotational direction R2 about the pivot point P1 towards the mounting portion 24 such that the raised protrusion 38 passes through the entrance 46E and is at least partially captured in the recess 46. Step 50C-1 can include causing the pivot point P1 to slide or otherwise move along the declined face 38D in a direction towards the first engagement face 34 during the pivoting of the head portion 26. Movement of the pivot point P1 along the declined face 38D can establish a ramping action between the declined face 38D and inclined face 46F.

Referring to FIG. 12, with continuing reference to FIG. 8, the head portion 26 can be pivoted in the rotational direction R2 about the pivot point P1 such that the first engagement face 34 and the second engagement face 42 abut against each other in a second position. The axis A3 of the head bore 44 may be misaligned with the axis A1 of the first mounting bore 36 during the pivoting of the head portion 26 in the rotational direction R1 (see, e.g., FIGS. 10-11) until the first engagement face 34 and the second engagement face 42 abut against each other in the second position. The axis A3 of the head bore 44 may be substantially aligned with the axis A1 of the first mounting bore 36 in the second position. The second engagement face 42 of the head portion 26 may be seated on the first engagement face 34 of the mounting portion 24 in the second position.

Referring to FIG. 13, with continuing reference to FIG. 8, step 50C can include securing the fastener F1 between the mounting portion 24 and head portion 26 to each other with the fastener F1 at step 50C-2. Securing the fastener F1 can include positioning the fastener F1 through the head bore 44 and then into the first mounting bore 36 of the mounting portion 24. Step 50C-2 can include rotating the fastener F1 in the rotational direction R1 about the first mounting bore axis A1 of the first mounting bore 36 to thread the fastener F1 into the first mounting bore 36. Securing the mounting portion 24 and head portion 26 with the fastener F1 can cause the head portion 26 to move in the direction D1 across the mounting portion 24 to bind or compress the inclined face 46F of the recess 46 against the declined face 38D of the raised protrusion 38 to lock the mounting portion 24 and head portion 26 to each other in the installed position. Securing the fastener F1 can occur such that the inclined face 46F of the head portion 26 applies a compressive force (e.g., load) CF against the declined face 38D of the raised protrusion 38 along the ramped interface RI. The compressive force CF may have a major component in a direction that is substantially perpendicular to the longitudinal axis LA of the raised protrusion 38 (see also FIGS. 5-7). The compressive force CF may be substantially parallel to the direction D1.

Method 50 can include one or more additional steps to install the implant system 20 at the surgical site. Referring to FIGS. 2 and 5, with continuing reference to FIG. 8, at step 50D a selected adapter 32 can be secured to the head portion 26. At step 50E, a selected articulation member 30 can be secured to the head portion 26. Step 50E can include securing the articulation member 30 to the adapter 32 such that the adapter 32 interconnects the head portion 26 and articulation member 30. In implementations, the articulation member 30 is secured directly to the head portion 26 and step 50D is omitted. The articulation member 30 can be positioned to mate with an opposed articular surface AS of an adjacent implant or an adjacent bone, as illustrated in FIG. 2. Method 50 can include positioning one or more bone fragments BF about a periphery of the mounting portion 24 and/or stem portion 22 at step 50F (bone fragments BF shown in dashed lines in FIG. 2 for illustrative purposes).

Figure 14:
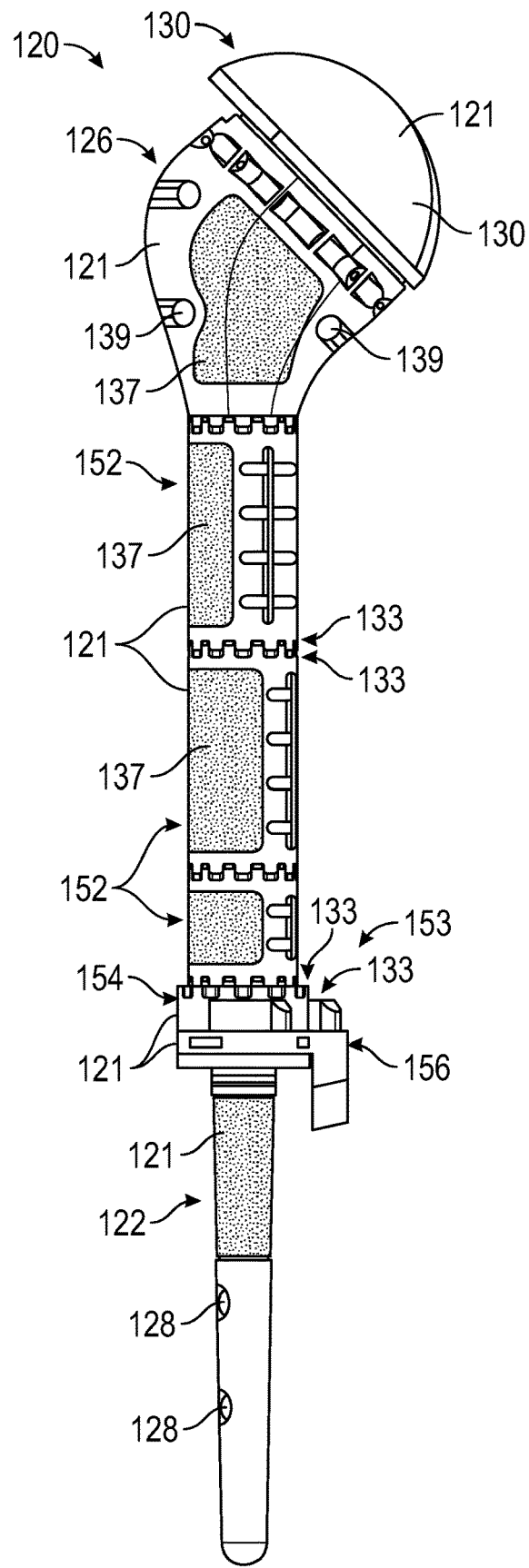
FIG. 14 illustrates a perspective view of another exemplary implant system.

Referring to FIG. 14, an orthopedic implant system 120 is disclosed. The implant system 120 may be utilized in various orthopedic procedures to restore functionality to a bone and/or joint, such as a shoulder joint during an anatomical or reverse shoulder arthroplasty. The implant system 120 may be utilized to restore functionality to one or more bones in a fractured or shattered condition. The implant system 120 may be utilized to restore functionality to long bones and other bones such as a humerus or femur. The implant system 20 may be utilized to restore functionality to other bones and joints such as a knee, hip, elbow, wrist or ankle. The implant system 120 can incorporate any of the features disclosed herein including any of the components 21 and other features of the implant system 20, and vice versa. In this disclosure, like reference numerals designate like elements where appropriate and reference numerals with the addition of one-hundred or multiples thereof designate modified elements that are understood to incorporate the same features and benefits of the corresponding original elements.

The implant system 120 can include one or more components 121. The components 121 may be fixedly attached or otherwise secured to each other. In implementations, one or more or each of the components 121 can be integrally formed with each other to establish the implant system 120.

Figure 15:
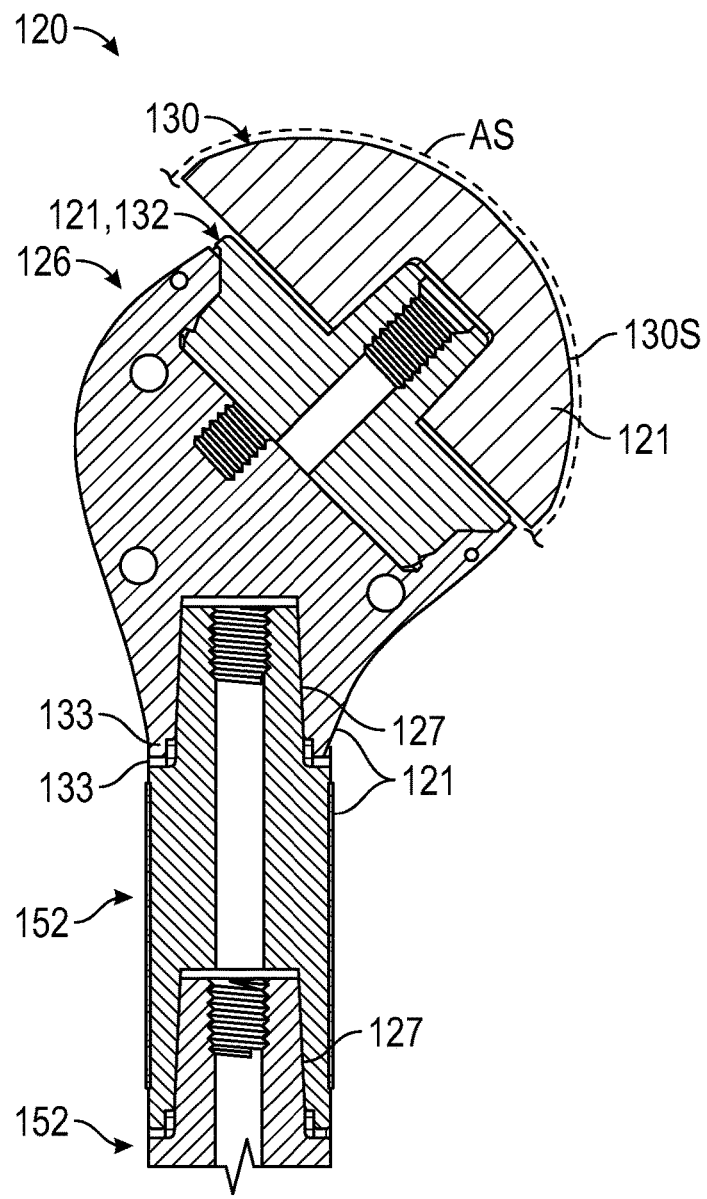
FIG. 15 illustrates a sectional view of portions of the implant system of FIG. 16.

The components 121 of the implant system 120 can include a stem portion 122 and head portion 126. The stem portion 122 can be insertable into bone. The head portion 126 can be adapted to mount an articulation member 130. The articulation member 130 can be configured to mate with an opposed articular surface, including any of the articular surfaces disclosed herein. Articular surface AS is shown in dashed lines in FIG. 15 for illustrative purposes. The components 121 can include at least one adapter (e.g., spacer) 132, as illustrated in FIG. 15. The adapter 132 can be dimensioned to interconnect the head portion 126 and articulation member 130. In implementations, the adapter 132 is omitted, and the articulation member 130 is coupled directly to the head portion 126.

The implant system 120 can include one or more intermediate portions 152. Each of the intermediate portions 152 can be adapted to interconnect the stem portion 122 and head portion 126. In implementations, the one or more of the intermediate portions 152 may be integrally formed with the stem portion 122. In other implementations, the implant system 120 may be configured such that one or more of the intermediate portions 152 may be omitted (see, e.g., implant system 120' of FIG. 16). In implementations, the intermediate portions 152 are omitted (see, e.g., implant system 20 of FIG. 1). The intermediate portions 152 can be provided to the surgeon in a kit to set a specified distance between the stem portion 122 and head portion 126.

Various techniques can be utilized to interconnect the components 121. The components 121 can include one or more Morse taper connections 127 dimensioned to limit relative axial and/or rotational movement between the components 121 (see, e.g., FIGS. 15-16). In implementations, the components 121 can include one or more sets of teeth 133 adapted to interlock or mesh with a set of teeth 133 of an adjacent one of the components 121. The interlocking teeth 133 can be dimensioned to limit relative rotation between the respective components 121. In implementations, the components 121 can be fixedly attached or otherwise secured to each other utilizing one or more fasteners.

Figure 17:
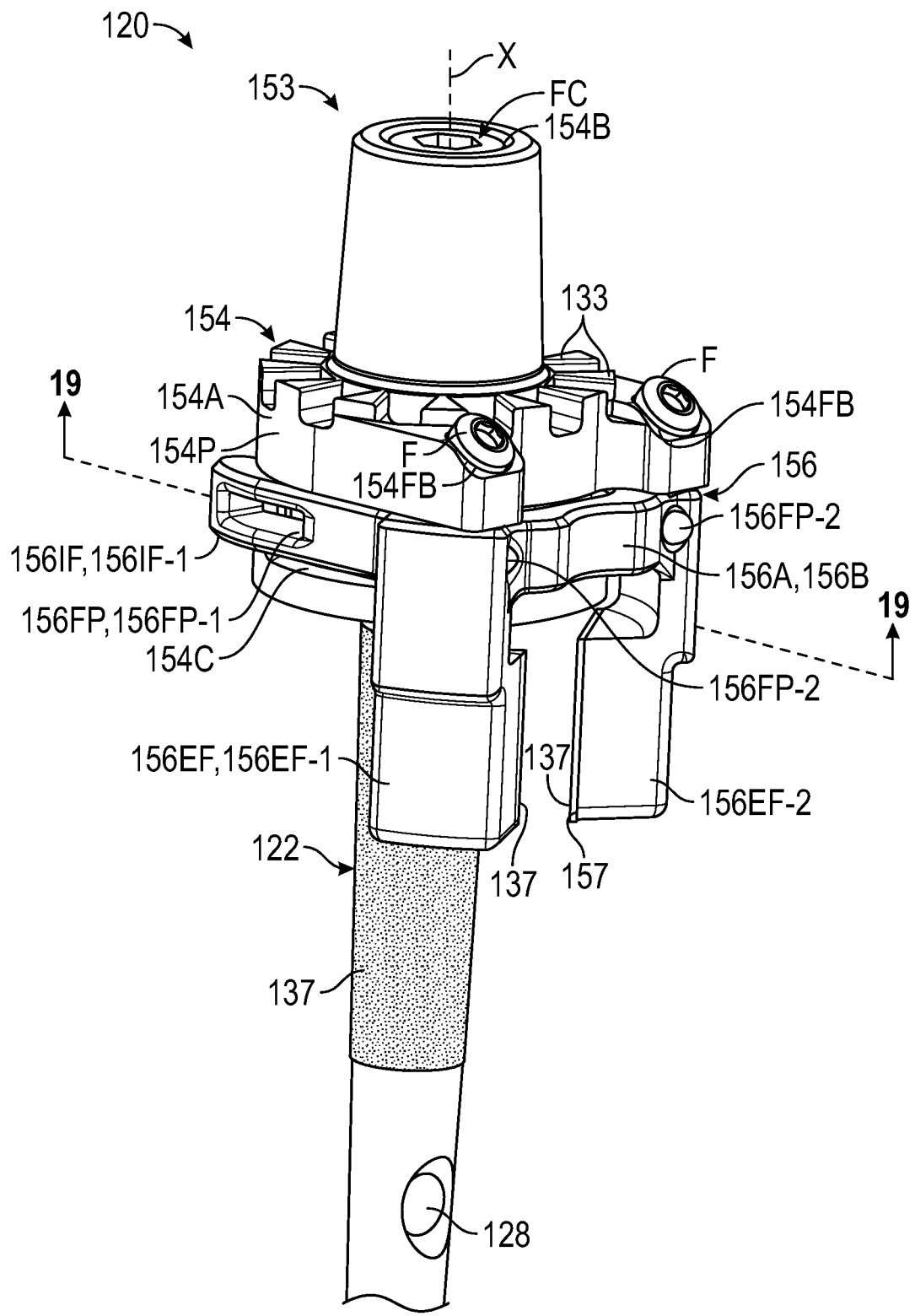
FIG. 17 illustrates a perspective view of a support assembly of the implant system of FIG. 14 including a collar portion and a flange portion in an installed position.
Figure 18:
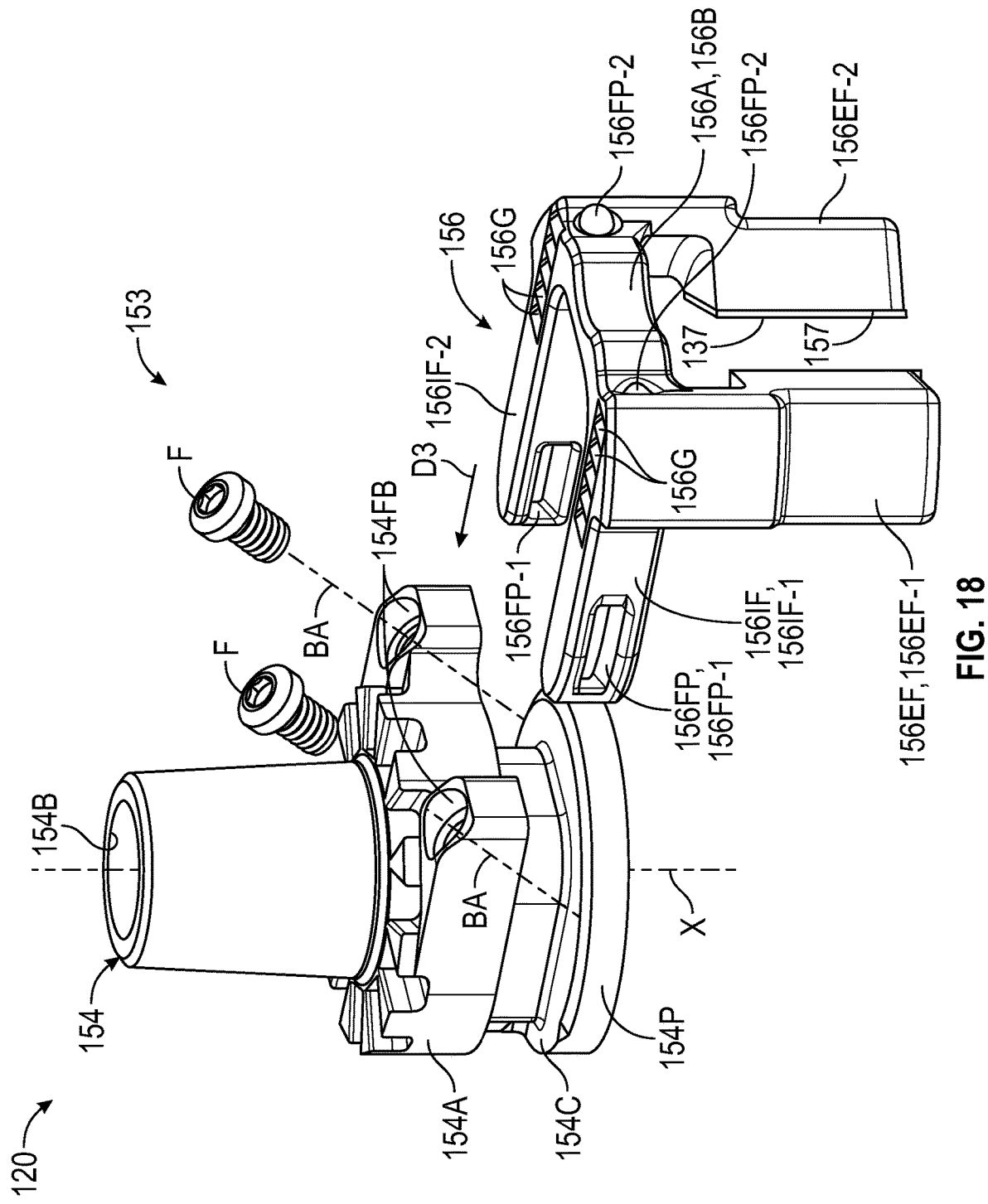
FIG. 18 illustrates an exploded view of the collar portion and flange portion of FIG. 17.

Referring to FIGS. 17 and 18, with continuing reference to FIG. 14, the implant system 120 can include a support assembly 153 for supporting the implant system 120 relative to bone or other tissue. The support assembly 153 can be adapted to support a proximal end portion of stem portion 122 when the stem portion 122 is situated in bone at a surgical site.

The support assembly 153 can include a collar portion 154 and flange portion 156. The flange portion 156 can be releasably secured to the collar portion 154. The collar portion 154 can be adapted to interconnect the head portion 126 and stem portion 122 (see, e.g., FIG. 14). The flange portion 156 may be adapted to cooperate with the collar portion 154 to apply a compressive force or load on an adjacent bone for reacting torsional loads that may be experienced by the stem portion 122 and/or other portions of the implant system 120 when implanted in the patient.

The stem portion 122 can include at least one or more fixation bores 128 (see also FIGS. 1-2 and 5). Each fixation bore 128 can be spaced apart from the collar portion 154 in the installed position. Each fixation bore 128 can be dimensioned to receive a respective bone fastener, which can be dimensioned to extend through the bone to fix a position of the stem portion 122 relative to the bone in the installed position (see, e.g., the stem portion 22 of FIG. 2).

Figure 16:
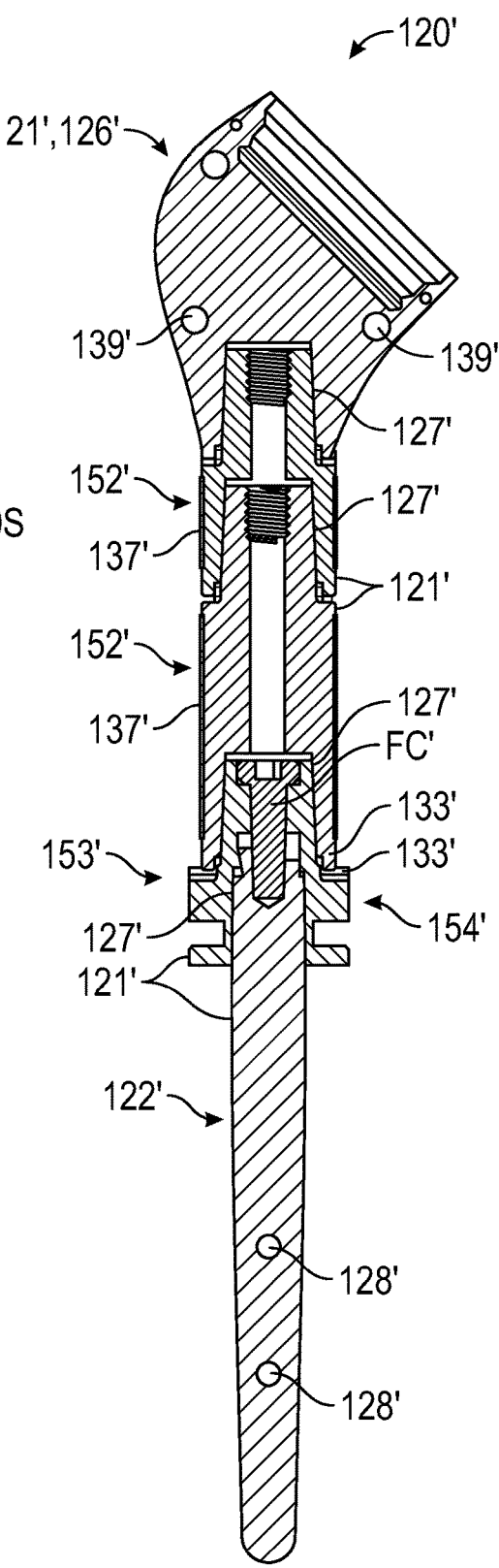
FIG. 16 illustrates a sectional view of another exemplary implant system.

The collar portion 154 can include a collar body 154A having a collar bore 154B and channel 154C. The collar bore 154B can be dimensioned to extend along a longitudinal axis X of the collar portion 154. The collar bore 154B can be dimensioned to receive an end 122E of the stem portion 122 (shown in FIG. 19 in dashed lines for illustrative purposes). The collar portion 154 can be fixedly attached or otherwise secured to the end 122E of the stem portion 122 with a fastener FC (FIG. 17, see also FIG. 16). The channel 154C can be dimensioned to receive the flange portion 156 to secure the flange portion 156 to the stem portion 122 (FIG. 17). The channel 154C can be established along, or otherwise at least partially in, the body 154A. The channel 154C can extend at least partially about a periphery (e.g., circumference) 154P of the collar portion 154. In implementation of FIG. 19, the channel 154C is dimensioned to extend substantially or completely about the longitudinal axis X of the collar portion 154 (see also FIG. 18).

The flange portion 156 can include a flange body 156A and at least one or more engagement flanges 156EF. Each engagement flange 156EF can be dimensioned to extend outwardly from the flange body 156A. Each engagement flange 156EF can be dimensioned to abut bone or other tissue in the installed position. In the implementation of FIGS. 17-18, the flange portion 156 can include first and second engagement flanges 156EF-1, 156EF-2. It should be understood that fewer or more than two engagement flanges 156 may be utilized, such as only one or three or more engagement flanges 156.

The engagement flanges 156EF can be arranged at various orientations relative to the flange body 156A. In implementations, the engagement flanges 156EF can be substantially parallel to each other. The engagement flanges 156EF can be circumferentially offset less than 180 degrees, or more narrowly less than or equal to about 120 degrees and/or greater than or equal to 90 degrees, relative to the longitudinal axis X of the collar portion 154 in the installed position.

Each engagement flange 156EF can include at least one engagement face 157. The engagement face 159 can be dimensioned to contact bone or other tissue, such as a cortical wall of a long bone (see, e.g., engagement faces 257 of FIG. 27). One or more surface treatments 137 can be disposed along the engagement flange 156EF to establish the respective engagement face 157 for promoting fixation with adjacent bone or other tissue (see, e.g., surface treatments 237 shown in dashed lines in FIG. 27). The surface treatments 137 can include any of the treatments disclosed herein, such as a porous construct or scaffold established in a thickness of the engagement flange 156EF or one or more porous layers of material disposed on the engagement flange 156EF.

The channel 154C of the collar portion 154 can be dimensioned to at least partially receive the flange body 156A. The flange body 156A can include one or more interface flanges 156IF. In the implementation of FIGS. 17-18, the flange portion 156 includes a set of (e.g., first and second) interface flanges 156IF-1, 156IF-2. The interface flanges 156IF can be dimensioned to be at least partially inserted into respective portions of the channel 154C to secure the flange portion 156 to the collar portion 154 (see also FIG. 19). The flange body 156A can include a bridge 156B that interconnects the interface flanges 156IF-1, 156IF-2 and engagement flanges 156EF-1, 156EF-2. The flange body 156A and interface flanges 156IF-1, 156IF-2 can cooperate to establish a generally U-shaped geometry. In implementation of FIG. 19, the interface flanges 156IF-1, 156IF-2 can be situated in the channel 154C on opposite sides of the longitudinal axis X of the collar portion 154 in the installed position. The interface flanges 156IF can be arranged at various orientations relative to the flange body 156A. In implementations, the interface flanges 156IF can be substantially parallel to each other. The pair of interface flanges 156IF can be substantially perpendicular to the pair of engagement flanges 156EF.

The support assembly 153 can include one or more features to secure the collar portion 154 and flange portion 156 to each other once a length or other dimension of the flexible construct FC is set. Each of the interface flanges 156IF can include a respective set of grooves 156G (FIG. 18). The collar portion 154 can include one or more fixation bores 154FB. Each fixation bore 154FB can extend along a respective bore axis BA. The fixation bore 154FB can be dimensioned such that a projection of the bore axis BA intersects the channel 154C, as illustrated in FIG. 18. Each of the fixation bores 154FB can be aligned with a selected groove 156G of the set of grooves 156G in the installed position. The support assembly 153 can include one or more fasteners F dimensioned to extend through the respective fixation bores 154FB to engage the selected groove 156G to secure the flange portion 156 and the collar portion 154 to each other in the installed position.

Figure 19:
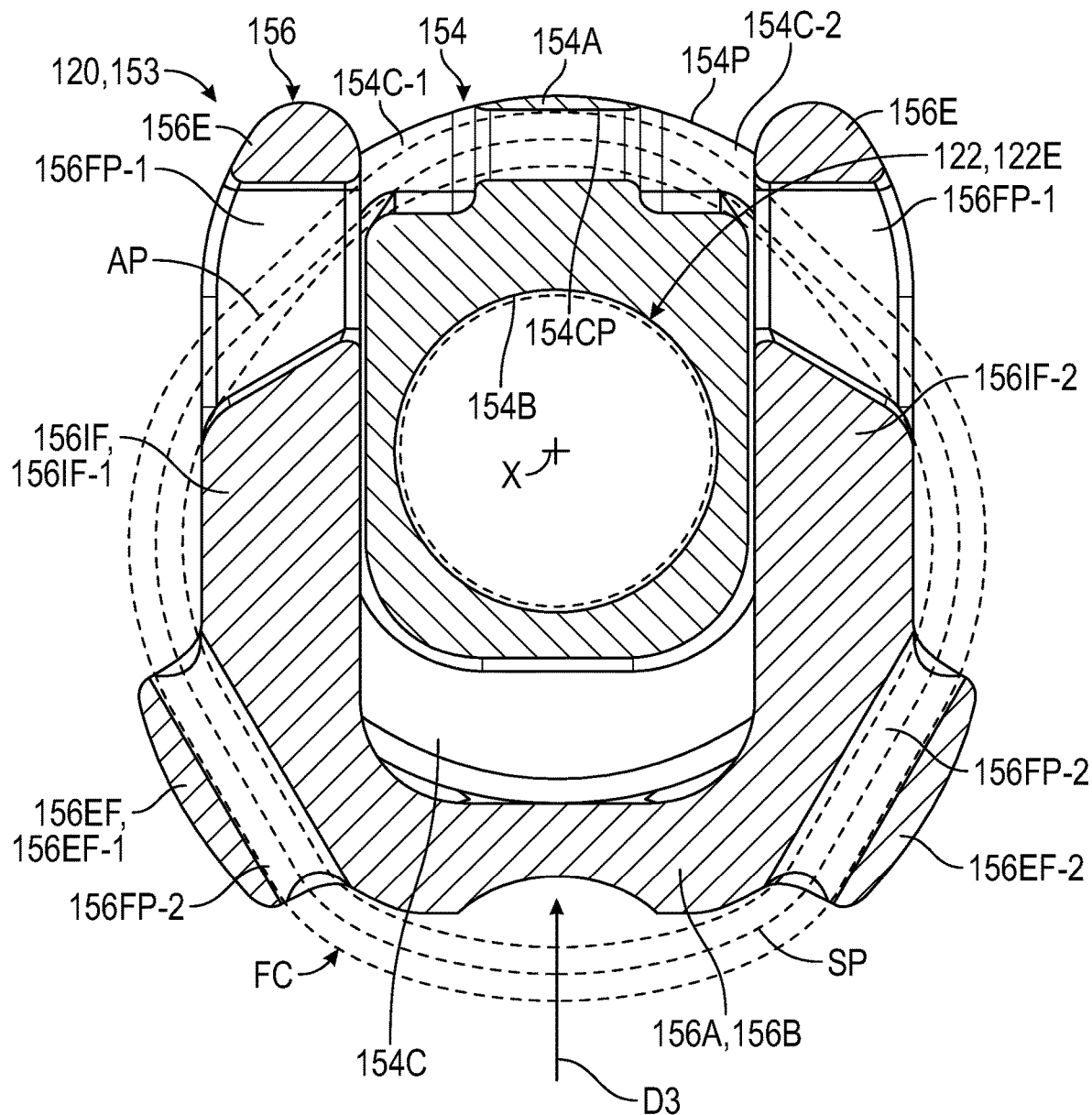
FIG. 19 illustrates a sectional view of the collar portion and flange portion taken along line 19-19 of FIG. 17.

The support assembly 153 can include one or more features to fix or otherwise set a distance between the flange portion 156 and the longitudinal axis X of the collar portion 154. In the implementation of FIG. 19, the collar portion 154 and flange portion 156 can be secured or coupled to each other with at least one flexible construct FC (shown in dashed lines for illustrative purposes). The support assembly 153 can cooperate with the flexible construct(s) FC to fix or otherwise set the distance between the flange portion 156 and the longitudinal axis X of the collar portion 154. In implementations, the support assembly 153 can cooperate with more than one flexible construct FC to fix or otherwise set the distance between the flange portion 156 and the collar portion 154. The flange portion 156 can be movable in a third direction D3 toward the collar portion 154 to trap a portion of bone between the engagement flanges 156EF and the stem portion 122 in response to fixing a length of the flexible construct FC in the installed position (see, e.g., stem portion 222 and support assembly 253 of FIG. 27).

Figure 19A:
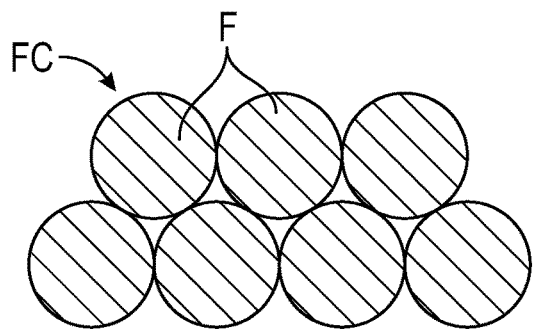

Various arrangements and materials can be utilized to establish the flexible construct FC. The flexible construct FC may comprise metallic and/or non-metallic materials, including inorganic and/or organic materials, and combinations thereof. The flexible construct FC may be established by a wire, chain, band, cable, rope, cord, suture, tape, filaments, yarns, adjustable knotless suture/button constructs, etc. The material may be reshapable and may rebound or may be permanently deformable. In the implementation of FIG. 19A, the flexible construct FC may include a length of suture having one or more filaments F. The filaments F can be continuous or discontinuous. The filaments F can be braided or twisted together to establish a length of the flexible construct FC. The flexible construct FC may be continuous or may have a discreet pair of ends securable to each other utilizing a knot or other fixation technique. The flexible construct FC may be a tensionable loop dimensioned to establish a loop about the longitudinal axis X of the collar portion 154 in the installed position. The flexible construct FC can be tied in a knot to form a loop (see, e.g., FIG. 27). In implementations, one or more knots can be formed at specified positions along the length of flexible construct FC, with the knots drawn against the collar portion 154 and/or flange portion 156 to set the specified length or dimension of the flexible construct FC.

Referring to FIG. 19, with continuing reference to FIGS. 17 and 18, the collar portion 154 and flange portion 156 can cooperate to establish a securement path SP (shown in dashed lines for illustrative purposes). The securement path SP can be dimensioned to extend at least partially, substantially or completely about the longitudinal axis X of the collar portion 154. The securement path SP can generally form a loop about the longitudinal axis X of the collar portion 154. In other implementations, the securement path SP extends only partially about the longitudinal axis X of the collar portion 154. In yet other implementations, the securement path SP may be substantially linear and may extend between a pair of discrete ends.

The securement path SP can be dimensioned to receive at least a portion of the flexible construct FC. The flexible construct FC can be situated along at least one or more segments of the securement path SP. The flexible construct FC can be situated at least partially, substantially or completely along an entire length of the securement path SP. In other implementations, the flexible construct FC extends along only one or more segments of the securement path SP such that the flexible construct FC may extend along less than the entire length of the securement path SP. The securement path SP can be continuous or can include one or more discontinuous segments.

The collar portion 154 and/or flange portion 156 can include one or more features for capturing each flexible construct FC along the respective the securement path SP. The channel 154C can establish one or more segments of the securement path SP, as illustrated by first and second channel segments 154C-1, 154C-2. The collar portion 154 can include at least one collar passage 154CP. The collar passage 154CP can be established along, and may enclose, a portion of the channel 154C. The collar passage 154CP can be dimensioned to interconnect the channel segments 154C-1, 154C-2 to establish the securement path SP.

The flange portion 156 can include one or more flange passages 156FP. The flange passages 156FP may establish respective portions of the securement path SP. The flange passages 156FP, channel 154C and/or collar passage 154CP can cooperate to establish respective segments of the securement path SP in the installed position.

Figure 20:
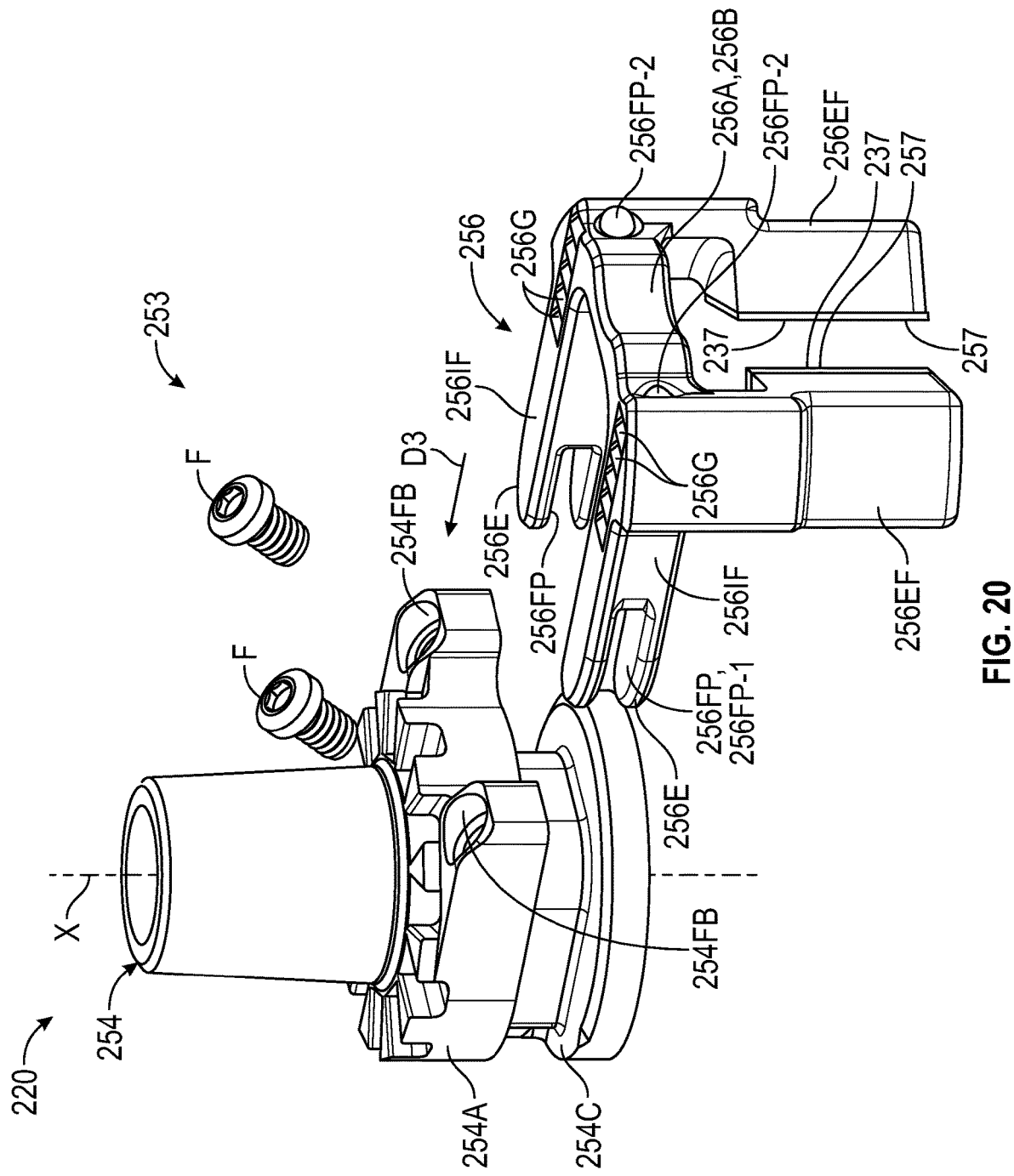
FIG. 20 illustrates an exploded view of another support assembly including a collar portion and flange portion.
Figure 21:
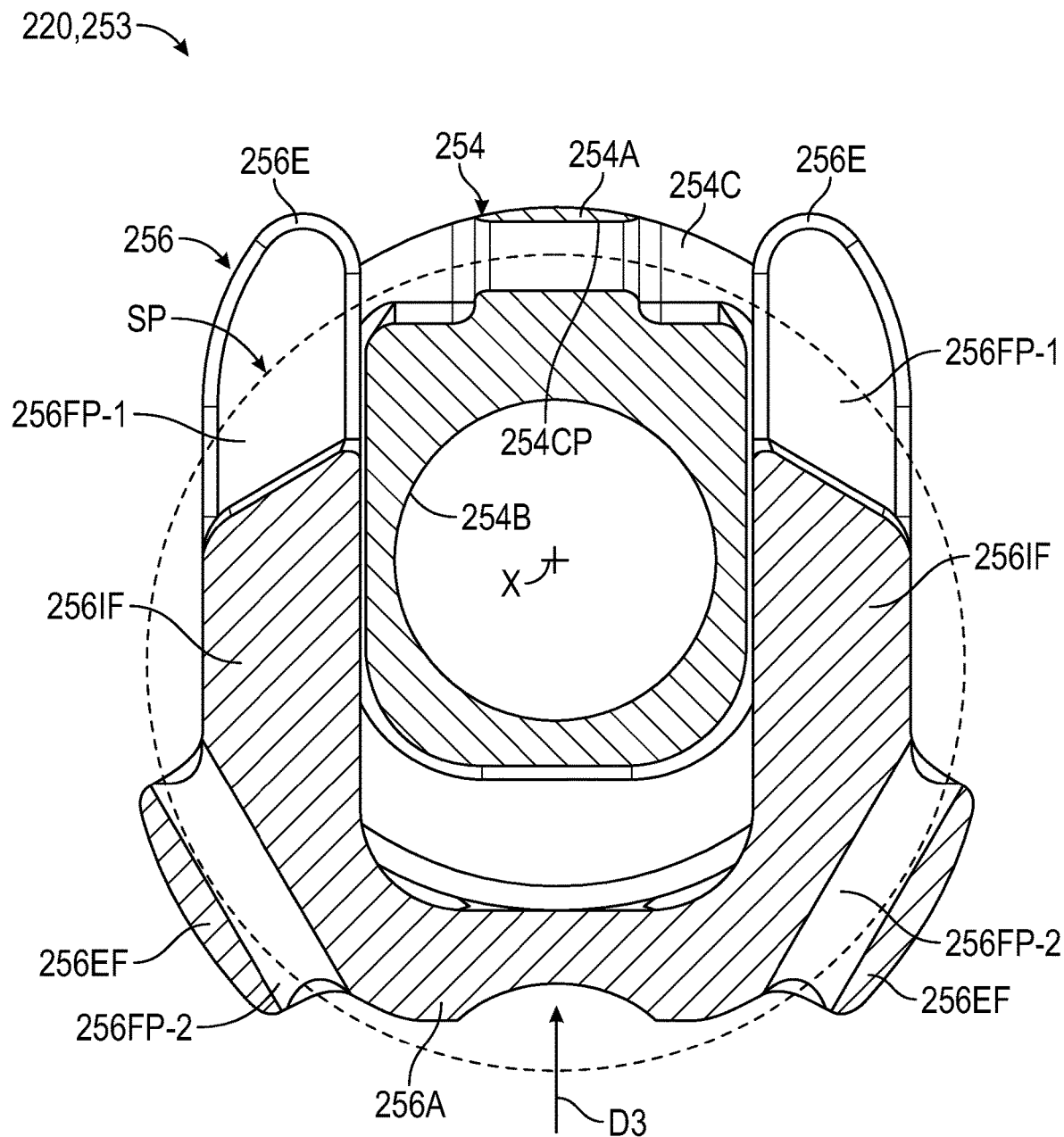
FIG. 21 illustrates a sectional view of the collar portion and flange portion of FIG. 20 in an installed position.

The flange passages 156FP can be established along various portions of the flange portion 156. In the implementation of FIG. 19, the flange body 156A can include a first set (e.g., pair) of flange passages 156FP-1 and a second set (e.g., pair) of flange passages 156FP-2. The first set of flange passages 156FP-1 can be established along, or can otherwise be adjacent to, free ends 156E of the respective interface flanges 156IF. In the implementation of FIGS. 20 and 21, a first set of flange passages 256FP-1 can be dimensioned to extend inwardly from free ends 256E of the respective interface flanges 256IF. The flange passages 256FP-1 may be open at the free ends 256E of the interface flanges 256IF such that the free ends 256E have a generally C-shaped geometry. The collar passage 254CP may be situated along a segment of the securement path SP between the pair of flange passages 156FP-1 in the installed position, as illustrated in FIG. 21.

Referring to FIG. 19, with continuing reference to FIGS. 17 and 18, the second set of flange passages 156FP-2 can be established along a segment passing through the flange body 156A between the first set of flange passages 156FP-1 relative to the securement path SP. The flange passages 156FP-2 can be established between the first set of flange passages 156F-1 and the engagement flanges 156EF. The flange passages 156FP-2 can be at least partially aligned with the respective engagement flanges 156EF. The flange passages 156FP-2 can be established at respective junctions between the flange body 156A and the respective engagement flanges 156EF-1, 156EF-2.

The first and second segments 154C-1, 154C-2 of the channel 154C and the respective flange passages 156FP-1 of the interface flanges 156IF can be at least partially aligned with each other in the installed position. The segments 154C-1, 154C-2 of the channel 154C, collar passage 154CP and flange passages 156FP can be substantially aligned with respect to each other relative to a reference plane that is perpendicular or otherwise transverse to the longitudinal axis X of the collar portion 154 in the installed position. The segments 154C-1, 154C-2 of the channel 154C, collar passage 154CP and first set of flange passages 156FP-1 can be at least partially aligned along an arc path AP in the installed position (shown in dashed lines). The arc path AP can extend at least partially about the longitudinal axis X of the collar portion 154. The arc path AP can establish a segment of the securement path SP.

Figure 22:
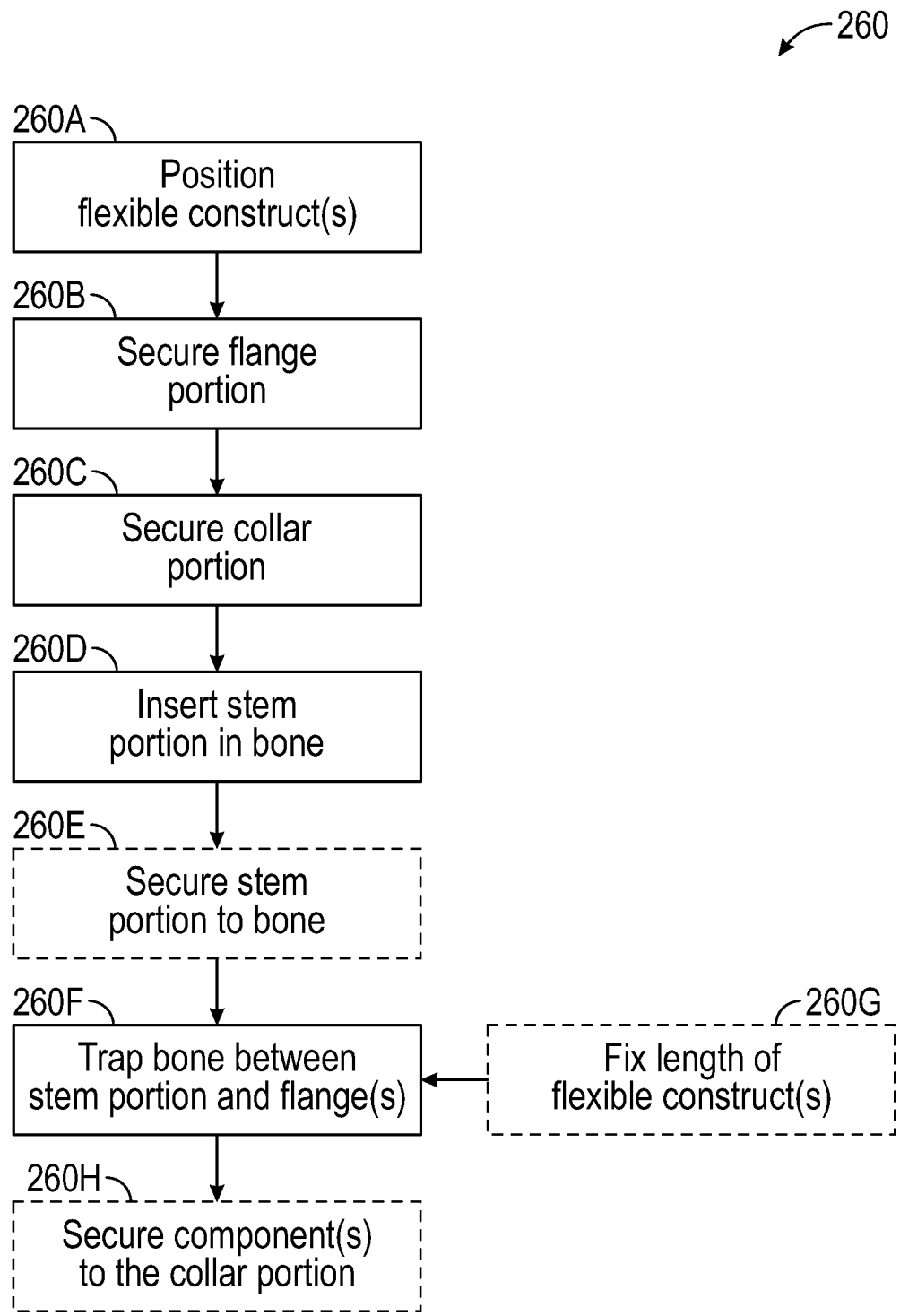
FIG. 22 illustrates another exemplary method of installing an orthopaedic implant system including a support assembly.

FIG. 22 illustrates a method of installing an orthopedic implant system in a flow chart 260 according to implementation. The method 260 can be utilized in an orthopedic procedure to restore functionality to a bone and/or joint, including any of the bones and joints disclosed herein. In implementations, the method 260 can be utilized in repair of a fractured or shattered proximal humerus or other long bone. The method 260 may be utilized in an anatomical shoulder or reverse shoulder arthroplasty. The method 260 can be utilized with any of the implant systems disclosed herein, including implant systems 20, 120 and/or 220. Reference is made to the implant system 220 for illustrative purposes. Fewer or additional steps than are recited below could be performed within the scope of this disclosure, and the recited order of steps is not intended to limit this disclosure.

Figure 23:
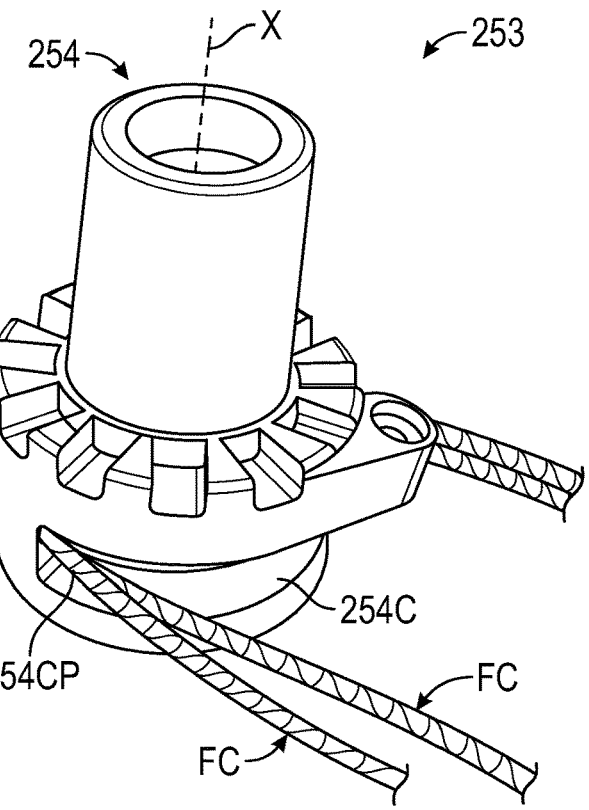
FIGS. 23 and 24 illustrate perspective views of flexible constructs positioned relative to the collar portion of FIG. 20.
Figure 24:
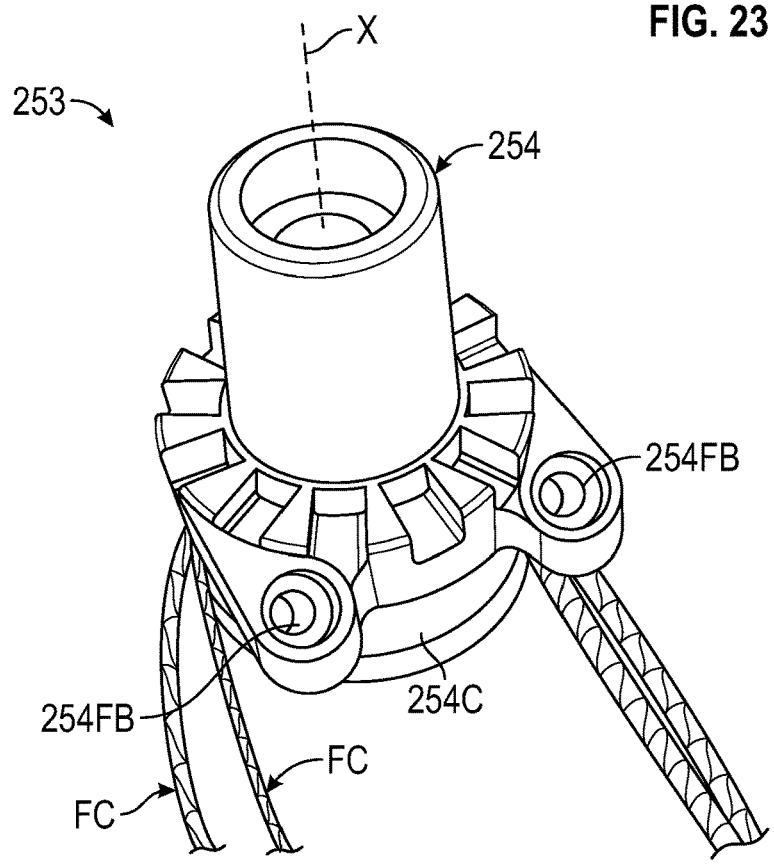
Figure 25:
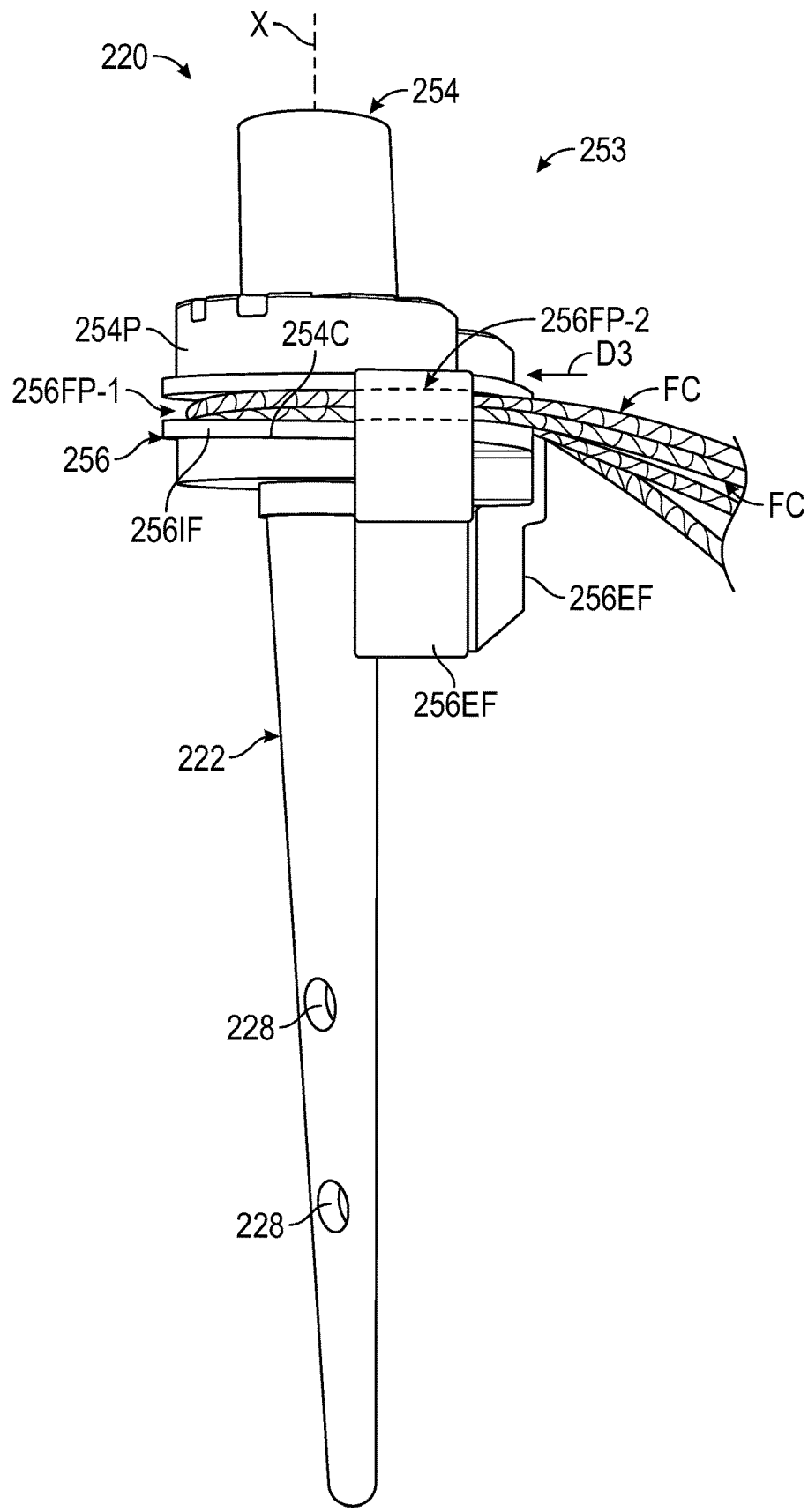
FIG. 25 illustrates a side view of the implant assembly of FIG. 20 including the flexible constructs positioned relative to the flange portion and the collar portion.

Referring to FIGS. 23 and 24, with continuing reference to FIG. 22, one or more flexible constructs FC can be positioned relative to the collar portion 254 and/or flange portion 256 at step 260A (see, e.g., FIG. 25). Step 260A may include looping the flexible construct FC about the collar portion 254 and flange portion 256. Step 260A can include passing one or more of the flexible constructs FC through the collar passage 254CP (FIG. 23) such that the flexible construct FC loops about the longitudinal axis X of the collar portion 254. At least a portion of each flexible construct FC can be positioned along a segment of the channel 254C. Referring to FIG. 25, with continuing reference to FIG. 22, a portion of each flexible construct FC can be positioned through one or more of the flange passages 256FP of the flange portion 256. Step 260A can include positioning each flexible construct FC through each of the first set of flange passages 256FP-1 and/or the second set of flanges passage 256FP-2 (shown in dashed lines for illustrative purposes).

At step 260B, the flange portion 256 can be secured to the collar portion 254. Step 260B can include moving the flange portion 256 in a third direction D3 towards the longitudinal axis X of the collar portion 254 and into abutment with the collar portion 254 such that each interface flange 256IF is at least partially received along a portion of the channel 254C. Step 260B can include at least partially inserting at least one or more interface flanges 254IF of the flange portion 256 into the channel 254C of the collar portion 254 in response to moving the flange portion 256 in the direction D3. Positioning the flexible construct FC at step 260A can be performed prior to, during, and/or subsequent to securing the collar portion 254 and flange portion 256 to each other at step 260B. Step 260A can include passing each flexible construct FC through at least one collar passage 254CP of the collar portion 254 and through at least one or more of the flange passages 256FP of the flange portion 256 prior to fixing a specified length of the flexible construct FC.

Figure 26:
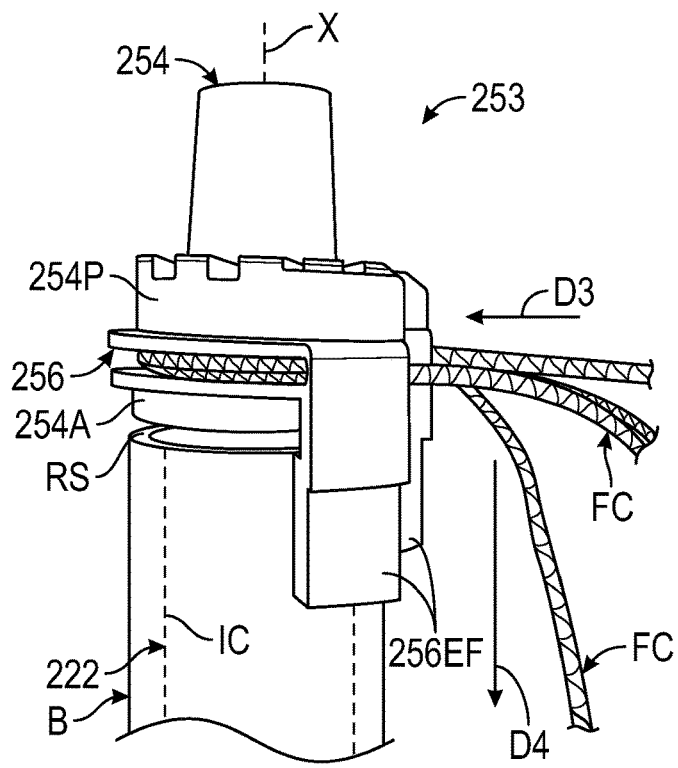
FIG. 26 illustrates a side view of the implant assembly of FIG. 25 situated relative to a bone.

Referring to FIG. 25, with continued reference to FIG. 22, the collar portion 254 and stem portion 222 can be secured to each other at step 260C utilizing any of the techniques disclosed herein. Referring to FIG. 26, with continuing reference to FIGS. 22 and 25, the stem portion 222 can be inserted into bone B at step 260D (stem portion 222 shown in dashed lines). Step 260D can include moving the stem portion in a fourth direction D4 such that at least a portion of the stem portion 222 is inserted into an intramedullary canal IC of the bone B (shown in dashed lines). The bone B may be any of the bones disclosed herein, such as a proximal humerus or another long bone of a patient. A portion of the bone B may be fragmented or shattered in response to trauma. Step 260D may include removing bone fragments from the surgical site and resecting the bone B to establish a resection surface RS prior to positioning the stem portion 222. Step 260D can occur such that the body 254A of the collar portion 254 sits on the resected surface RS of the bone B, as illustrated in FIG. 27.

The stem portion 222 can be secured to the bone B at step 260E. The stem portion 222 can include one or more fixation bores 228 (FIG. 25). Step 260E can include positioning bone fasteners through each of the respective fixation bores 228 and into the bone B prior to fixing the length of each flexible construct FC (see, e.g., fasteners F of FIG. 2).

Figure 27:
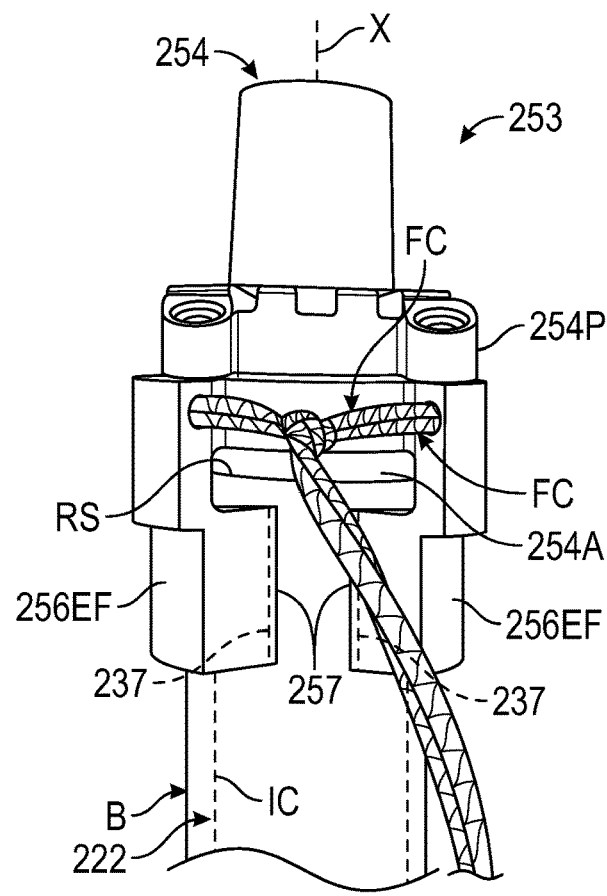
FIG. 27 illustrates another side view of the implant assembly of FIG. 26 including fixing a dimension of each flexible construct.

Referring to FIG. 27, with continuing reference to FIGS. 22 and 26, at step 260F the bone B can be compressed or otherwise trapped between the stem portion 222 and one or more of the engagement flanges 256EF of the flange portion 256. Step 260F can include fixing a length of the respective flexible construct FC to secure or couple the collar portion 254 and flange portion 256 to each other at step 260G. Step 260A can include looping one or more of the flexible constructs FC around the periphery 254P of the collar portion 254 and through the flange passages 256FP of the flange portion 256 and then tensioning the flexible construct FC at step 260F prior to fixing the length of the flexible construct FC at step 260G. Step 260F can include tensioning the flexible construct(s) FC to cause the flange portion 256 to be drawn in the direction D3 towards the collar portion 254 and then tying the flexible construct FC in a knot at step 260G, as illustrated in FIG. 27. Other techniques can be utilized to fix the length of flexible construct FC including securing one or more clips or other fasteners onto the flexible construct FC to the establish or set the specified length of the flexible construct FC.

Step 260G can include fixing the selected position of the flange portion 256 relative to the collar portion 254, such as by inserting fasteners F in respective fixation bores 254FB to engage the respective grooves 256G (see FIG. 20, see also FIGS. 17-18).

At step 260H one or more components of the implant system 220 can be secured to the collar portion 254. The collar portion 254 can interconnect the stem portion 222, intermediate portions and/or a head portion adapted to mount an articulation member (see, e.g., implant system 120 of FIGS. 14 and 15).

Method 260 can include one or more additional steps performed prior to, during, or subsequent to steps 260A-260H. Method 260 can include positioning one or more bone fragments and/or soft tissue about the implant system 220, and situating the articular portion relative to an opposed articular surface to restore functionality to a joint (see, e.g., implant system 20 of FIG. 2).

The novel implant systems and methods of this disclosure may provide versatility in repairing bone defects restoring functionality to bones and/or joints. The disclosed implant systems described herein may include a taper locking mechanism to limit or otherwise oppose separation between the components, which may improve fixation and healing of the patient. The disclosed implant systems may include one or more flanges adapted to abut an exterior of the bone to promote torsional stability when the implant system is placed under torsional loads. One or more flexible constructs may be utilized to secure the flanges to another component of the implant system at a specified distance to apply a compress force or load on the exterior of the bone, which may promote alignment and functionality of the restored joint and healing of the patient.

Although the different non-limiting embodiments are illustrated as having specific components or steps, the embodiments of this disclosure are not limited to those

What is claimed is:

1. An orthopaedic implant system comprising:
   a stem portion insertable into bone;
   a mounting portion extending from the stem portion, wherein the mounting portion includes a first mounting bore extending inwardly from a first engagement face and a raised protrusion extending outwardly from the first engagement face, and wherein the raised protrusion tapers along a declined face toward the first engagement face;
   a head portion adapted to mount an articulation member, wherein the head portion includes a head bore extending inwardly from a second engagement face and a recess extending inwardly from the second engagement face, wherein a periphery of the recess includes an inclined face sloping towards an opening of the recess along the second engagement face;
   wherein the raised protrusion is insertable through the opening and into the recess such that the declined face and the inclined face abut each other in an installed position; and
   wherein the first mounting bore extends along a first mounting bore axis in a direction away from the raised protrusion such that the second engagement face slides across the first engagement face and such that the inclined face moves towards the first mounting bore axis to compress the inclined face against the declined face in response to securing a common fastener in the head bore and the first mounting bore.

2. The system as recited in claim 1, wherein the articulation member is adapted to mate with an opposed articular surface of an adjacent implant or an adjacent bone.

3. The system as recited in claim 1, wherein a maximum length of the raised protrusion is greater than a minimum length of the opening.

4. The system as recited in claim 1, wherein the second engagement face of the head portion slides across the first engagement face in response to rotation of the common fastener about the first mounting bore axis.

5. The system as recited in claim 1, wherein:
   the head portion includes a pair of walls interconnecting the inclined face and an arcuate lip to establish the periphery of the recess, the pair of walls oppose each other on opposite sides of the head bore, the arcuate lip is opposed to the inclined face and is dimensioned to follow a perimeter of the head bore; and
   the mounting portion includes a pair of faces on opposite sides of the raised protrusion, the declined face interconnects the pair of faces, and the pair of faces are dimensioned to engage the respective pair of walls to limit relative movement between the head portion and the mounting portion in the installed position.

6. The system as recited in claim 5, wherein a maximum length of the raised protrusion is greater than a minimum length of the opening.

7. An orthopaedic implant system comprising:
   a stem portion insertable into bone;
   a mounting portion extending from the stem portion, wherein the mounting portion includes a first mounting bore extending inwardly from a first engagement face and a raised protrusion extending outwardly from the first engagement face, and wherein the raised protrusion tapers along a declined face toward the first engagement face; and
   a head portion adapted to mount an articulation member, wherein the head portion includes a head bore extending inwardly from a second engagement face and a recess extending inwardly from the second engagement face, wherein a periphery of the recess includes an inclined face sloping towards an opening of the recess along the second engagement face;
   wherein the raised protrusion is insertable through the opening and into the recess such that the declined face and the inclined face abut each other in an installed position;
   wherein the first mounting bore extends along a first mounting bore axis in a direction away from the raised protrusion such that the inclined face moves towards the first mounting bore axis to compress the inclined face against the declined face in response to securing a common fastener in the head bore and the first mounting bore;
   wherein the first engagement face of the mounting portion extends along a first reference plane, and the first mounting bore axis intersects the first reference plane to establish an acute first bore angle;
   wherein the declined face of the raised protrusion extends along a second reference plane, and the second reference plane intersects the first reference plane to establish an acute ramp angle; and
   wherein the ramp angle is less than the first bore angle.

8. The system as recited in claim 7, wherein the raised protrusion includes a second mounting bore extending along a second mounting bore axis, the second mounting bore is dimensioned to receive a fastener to secure an adapter to the mounting portion, and the adapter is adapted to interconnect the head portion and the articulation member.

9. The system as recited in claim 8, wherein the second mounting bore axis intersects the first reference plane to establish a second bore angle, and the second bore angle differs from the first bore angle and differs from the ramp angle.

10. The system as recited in claim 7, wherein the articulation member is adapted to mate with an opposed articular surface of an adjacent implant or an adjacent bone.

11. The system as recited in claim 7, wherein a maximum length of the raised protrusion is greater than a minimum length of the opening.

12. The system as recited in claim 7, wherein the second engagement face of the head portion slides across the first engagement face in response to rotation of the common fastener about the first mounting bore axis.

13. An orthopaedic implant assembly comprising:
   a head portion adapted to mount an articulation member, the articulation member configured to mate with an opposed articular surface, wherein the head portion includes a head bore extending inwardly from a second engagement face and a recess extending inwardly from the second engagement face, wherein periphery of the recess includes an inclined face sloping towards a opening of the recess along the second engagement face;

a stem portion insertable into bone;

a mounting portion extending from the stem portion, wherein the mounting portion includes a first mounting bore extending inwardly from a first engagement face and a raised protrusion extending outwardly from the first engagement face, and wherein the raised protrusion tapers along a declined face toward the first engagement face;

a collar portion adapted to interconnect the head portion and the stem portion; and a flange portion releasably securable to the collar portion, the flange portion including a flange body and at least one engagement flange dimensioned to abut bone;

wherein the raised protrusion is insertable through the opening and into the recess such that the declined face and the inclined face abut each other in an installed position;

wherein the first mounting bore extends along a first mounting bore axis in a direction away from the raised protrusion such that the inclined face moves towards the first mounting ore axis to compress the inclined face against the declined face in response to securing a common fastener in the head bore and the first mounting bore; and wherein the collar portion includes a channel dimensioned to at least partially receive the flange body, the flange portion is moveable in a direction towards the collar portion to trap a portion of bone between the at least one engagement flange and the stem portion in response to fixing a length of a flexible construct that couples the collar portion and the flange portion in an installed position.

14. The assembly as recited in claim 13, wherein the flexible construct is dimensioned to loop about a longitudinal axis of the collar portion in the installed position.

15. The assembly as recited in claim 13, wherein the collar portion includes at least one collar passage dimensioned to receive a respective length of the flexible construct.

16. The assembly as recited in claim 15, wherein the flange body includes one or more flange passages dimensioned to receive a respective length of the flexible construct.

17. The assembly as recited in claim 16, wherein:
the channel extends about a periphery of the collar portion; and
the channel, the at least one collar passage and the one or more flange passages are at least partially aligned along an arc path in the installed position.

18. The assembly as recited in claim 17, wherein the flexible construct is dimensioned to loop about a longitudinal axis of the collar portion in the installed position.

19. The assembly as recited in claim 13, wherein the flexible construct comprises a length of suture.

20. The assembly as recited in claim 13, wherein the flange body includes a first interface flange and a second interface flange insertable into respective portions of the channel.

21. The assembly as recited in claim 20, wherein the first interface flange and the second interface flange include a respective set of grooves, and the collar portion includes a plurality of bores each aligned with a selected groove of the set of grooves in the installed position, and further comprising:
a plurality of fasteners dimensioned to extend through the respective bores to engage the selected groove to secure the flange portion and the collar portion to each other in the installed position.

22. The assembly as recited in claim 20, wherein the collar portion includes a collar passage interconnecting first and second segments of the channel to establish a securement path.

23. The assembly as recited in claim 22, wherein the at least one engagement flange includes a first engagement flange and a second engagement flange, the flange body includes first and second flange passages that establish the securement path, and the first and second flange passages are established at respective junctions between the flange body and the first and second engagement flanges.

24. The assembly as recited in claim 22, wherein the flange portion includes a third flange passage adjacent a free end of the first interface flange and a fourth flange passage adjacent a free end of the second interface flange, and the collar passage is situated along a segment of the securement path between the third flange passage and the fourth flange passage in the installed position.

25. The assembly as recited in claim 13, wherein the stem portion includes at least one fixation bore spaced apart from the collar portion in the installed position, and the at least one fixation bore dimensioned to receive a respective bone fastener that extends through the bone in the installed position.

* * * * *

UNITED STATES PATENT AND TRADEMARK OFFICE
CERTIFICATE OF CORRECTION

| | | |
|---|---|---|
| PATENT NO. | : 12,472,067 B2 | Page 1 of 1 |
| APPLICATION NO. | : 17/942046 | |
| DATED | : November 18, 2025 | |
| INVENTOR(S) | : Khosla et al. | |

It is certified that error appears in the above-identified patent and that said Letters Patent is hereby corrected as shown below:

In the Claims

Claim 13, Column 23, Line 26, change "mounting ore axis" to --mounting bore axis--.

Signed and Sealed this
Sixteenth Day of December, 2025

John A. Squires
*Director of the United States Patent and Trademark Office*